United States Patent
Toyoda et al.

(10) Patent No.: US 9,210,334 B2
(45) Date of Patent: Dec. 8, 2015

(54) IMAGING APPARATUS AND IMAGING METHOD FOR FLARE PORTRAIT SCENE IMAGING

(71) Applicant: Olympus Imaging Corp., Shibuya-ku, Tokyo (JP)

(72) Inventors: Tetsuya Toyoda, Hachioji (JP); Osamu Nonaka, Sagamihara (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 14/071,813

(22) Filed: Nov. 5, 2013

(65) Prior Publication Data

US 2014/0125863 A1    May 8, 2014

(30) Foreign Application Priority Data

Nov. 7, 2012   (JP) .................................. 2012-245382

(51) Int. Cl.
  *H04N 5/235* (2006.01)
  *H04N 5/232* (2006.01)
  *H04N 9/04* (2006.01)
(52) U.S. Cl.
  CPC .......... *H04N 5/2355* (2013.01); *H04N 5/23219* (2013.01); *H04N 5/23293* (2013.01); *H04N 9/045* (2013.01)
(58) Field of Classification Search
  CPC .................................................. H04N 5/2351
  USPC ......................................................... 348/362
  See application file for complete search history.

(56) References Cited

U.S. PATENT DOCUMENTS

| | | | |
|---|---|---|---|
| 6,246,837 B1* | 6/2001 | Kageyama et al. | 396/287 |
| 2004/0119874 A1* | 6/2004 | Imai | 348/362 |
| 2005/0187437 A1* | 8/2005 | Matsugu et al. | 600/301 |
| 2006/0027733 A1* | 2/2006 | Terzioglu et al. | 250/208.1 |
| 2006/0055784 A1* | 3/2006 | Sugihara et al. | 348/207.99 |
| 2008/0094493 A1* | 4/2008 | Igarashi | 348/254 |
| 2009/0073275 A1* | 3/2009 | Awazu | 348/222.1 |

(Continued)

FOREIGN PATENT DOCUMENTS

| | | |
|---|---|---|
| JP | 64-60156 | 3/1989 |
| JP | 02-020840 | 1/1990 |

(Continued)

OTHER PUBLICATIONS

English Translation: JP Patent Application Publication 2008-131542; Published on Jun. 5, 2008. Industrial Property Digital Library PAJ—Machine Translation.*

(Continued)

*Primary Examiner* — Roberto Velez
*Assistant Examiner* — Cynthia Segura
(74) *Attorney, Agent, or Firm* — John C. Pokotylo; Straub & Pokotylo

(57) ABSTRACT

An imaging apparatus includes an imaging unit, a main subject detecting unit, and control unit. The imaging unit includes an imaging element. The imaging unit generates image data. The main subject detecting unit detects a main subject from the image data. The control unit compares an exposure value of the image data with a predetermined appropriate value and performs an exposure control so that the exposure value for the main subject part in the image data changes to the appropriate value and the exposure value for a part excluding the main subject part in the image data changes to a value larger than the appropriate value.

13 Claims, 17 Drawing Sheets

(56) References Cited

U.S. PATENT DOCUMENTS

2010/0315521 A1* 12/2010 Kunishige et al. ......... 348/220.1
2012/0098993 A1* 4/2012 Takahashi ................. 348/222.1
2012/0134558 A1* 5/2012 Sienkiewicz ................. 382/128

FOREIGN PATENT DOCUMENTS

| JP | 08-095146 | 4/1996 | | |
|---|---|---|---|---|
| JP | 2006-311311 | 11/2006 | | |
| JP | 2007-074163 | 3/2007 | | |
| JP | 2007-228118 | 9/2007 | | |
| JP | 2007-243384 | 9/2007 | | |
| JP | 2008131542 A | * | 6/2008 | ............... H04N 1/46 |
| JP | 2012-156647 | 8/2012 | | |

OTHER PUBLICATIONS

Office Action for corresponding Japanese Patent Application Serial No. 2012-245382, mailed Jul. 29, 2014 (2 pgs.), with translation (2 pgs.).

Office Action to Japanese Patent Application No. 2014-226278, mailed on Aug. 18, 2015 (3 pgs.) with translation (4 pgs.).

* cited by examiner

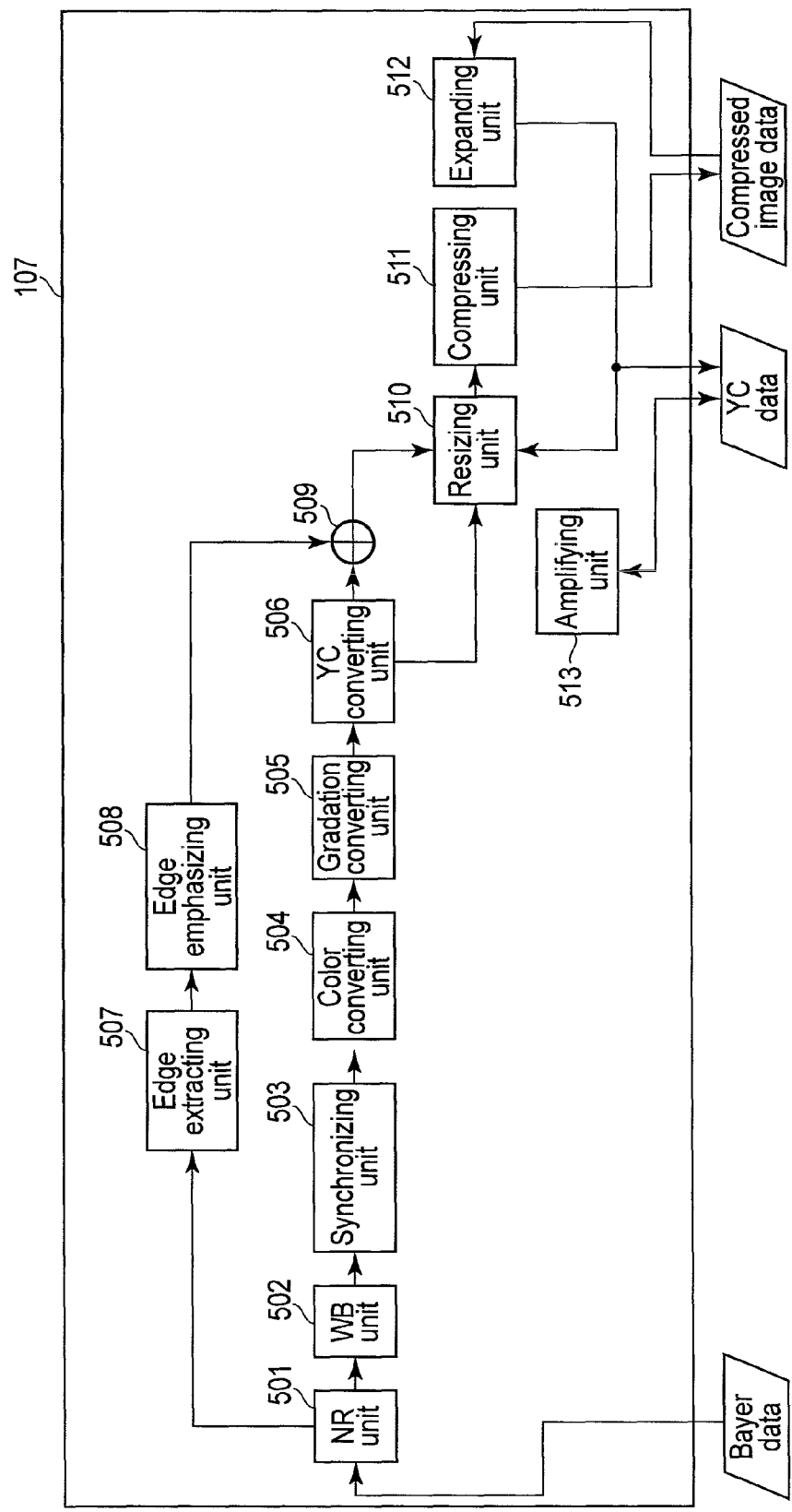
F I G. 3

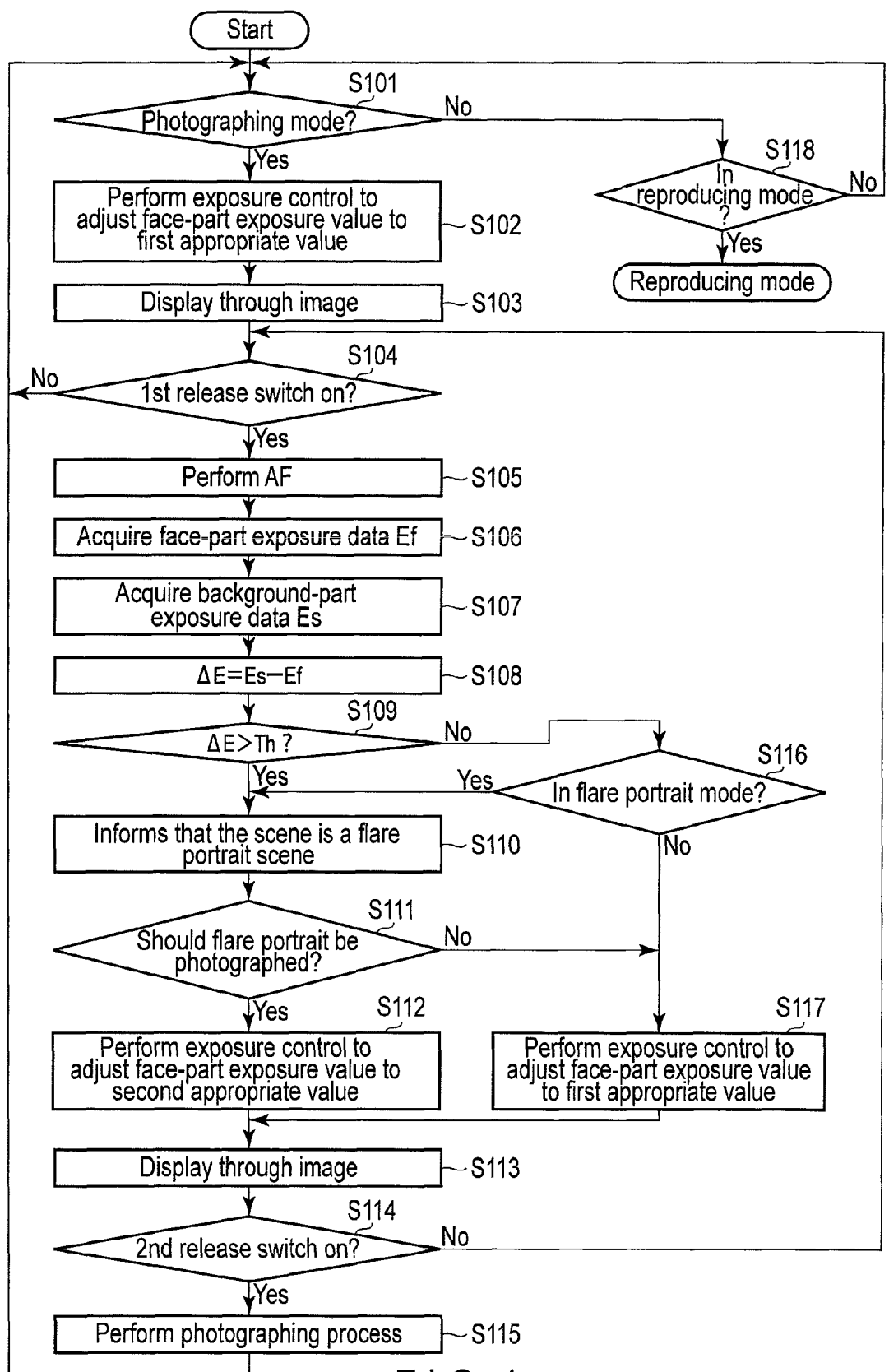
F I G. 4

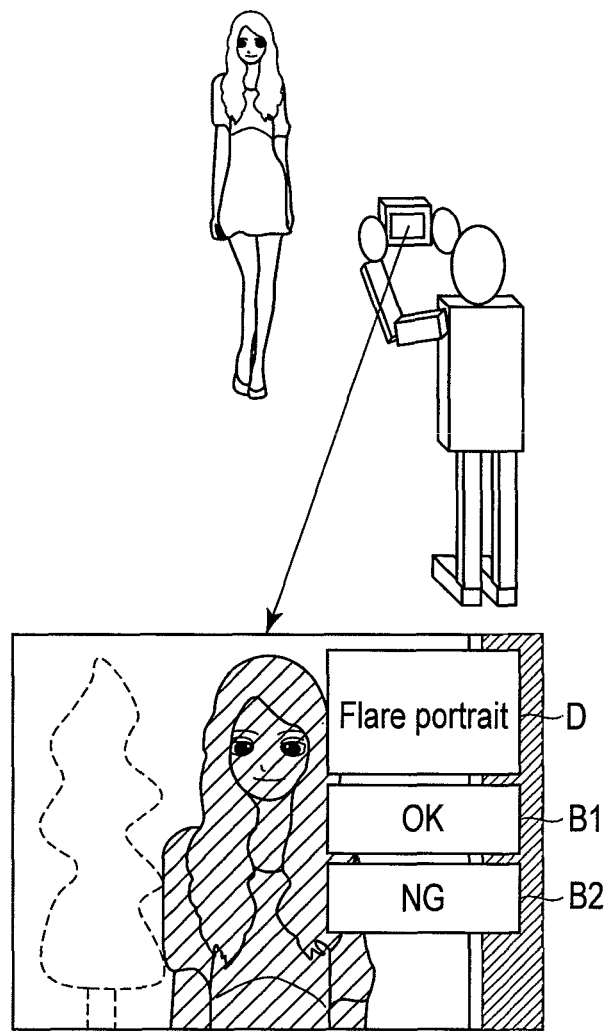
F I G. 6

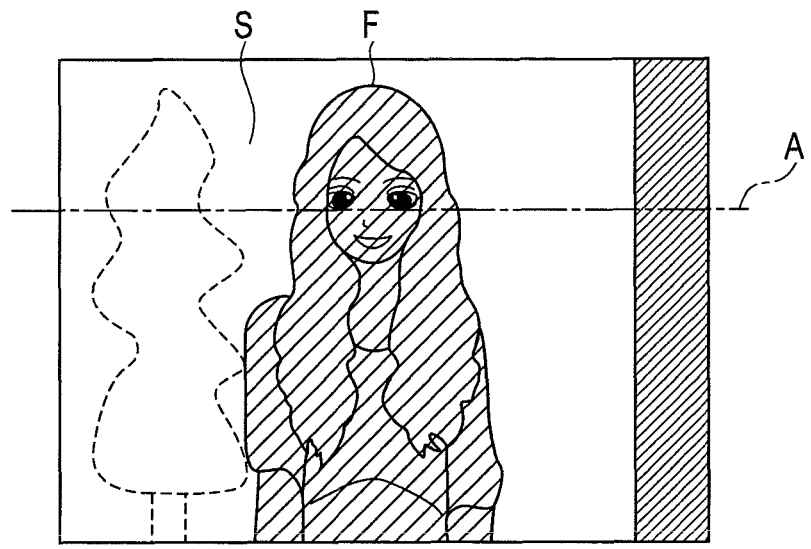
F I G. 7A
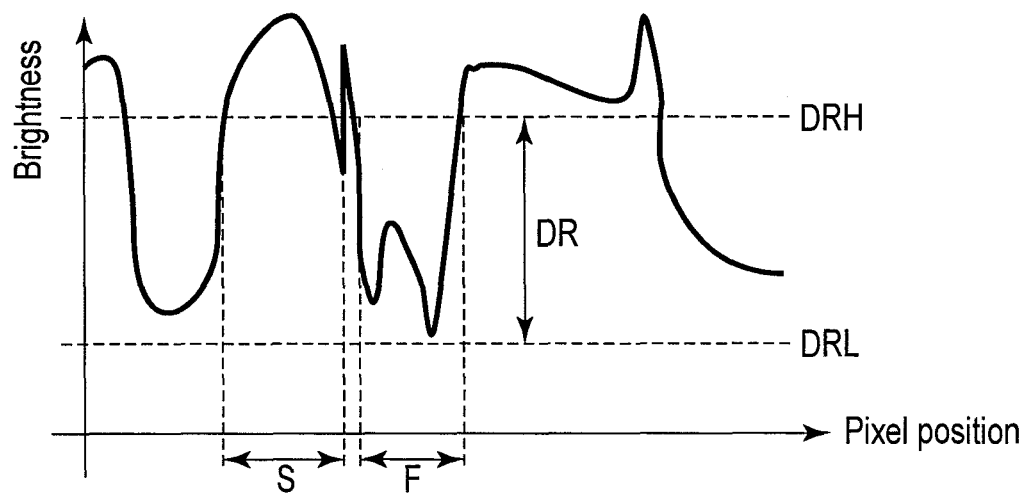
F I G. 7B

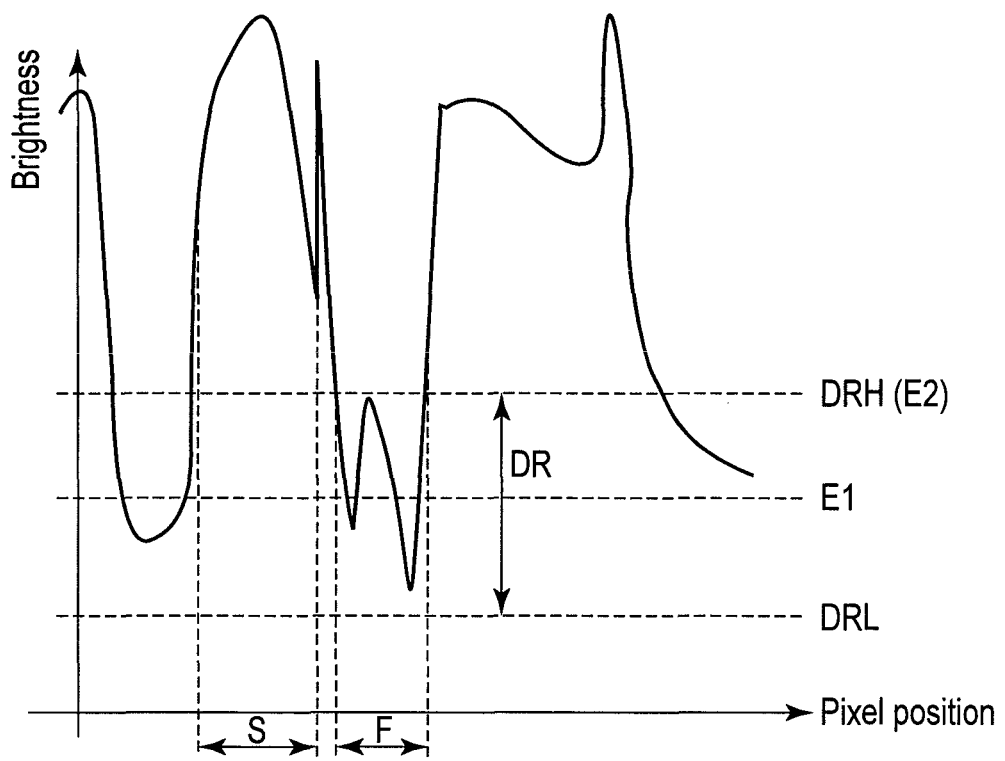
F I G. 9

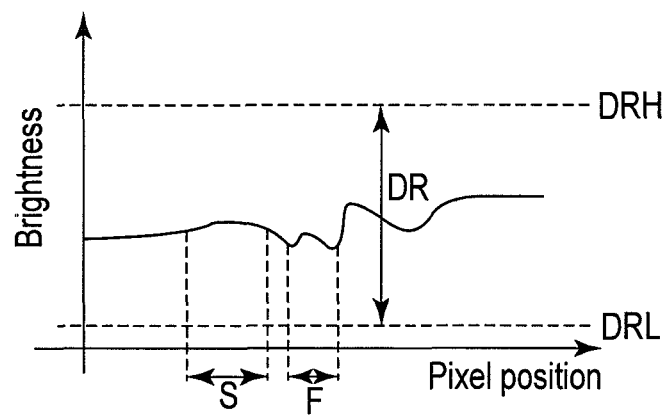
F I G. 11A
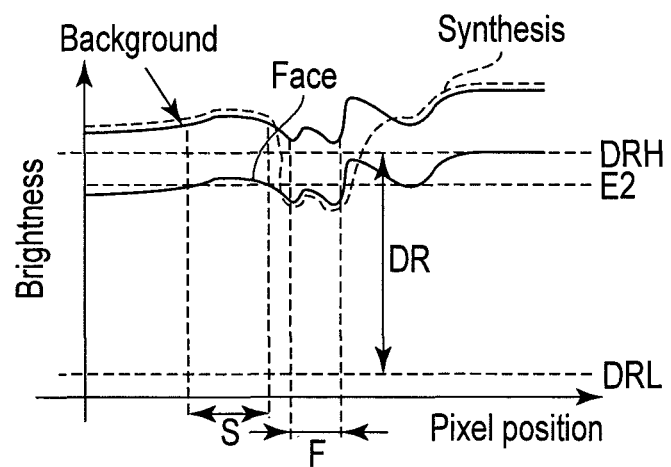
F I G. 11B

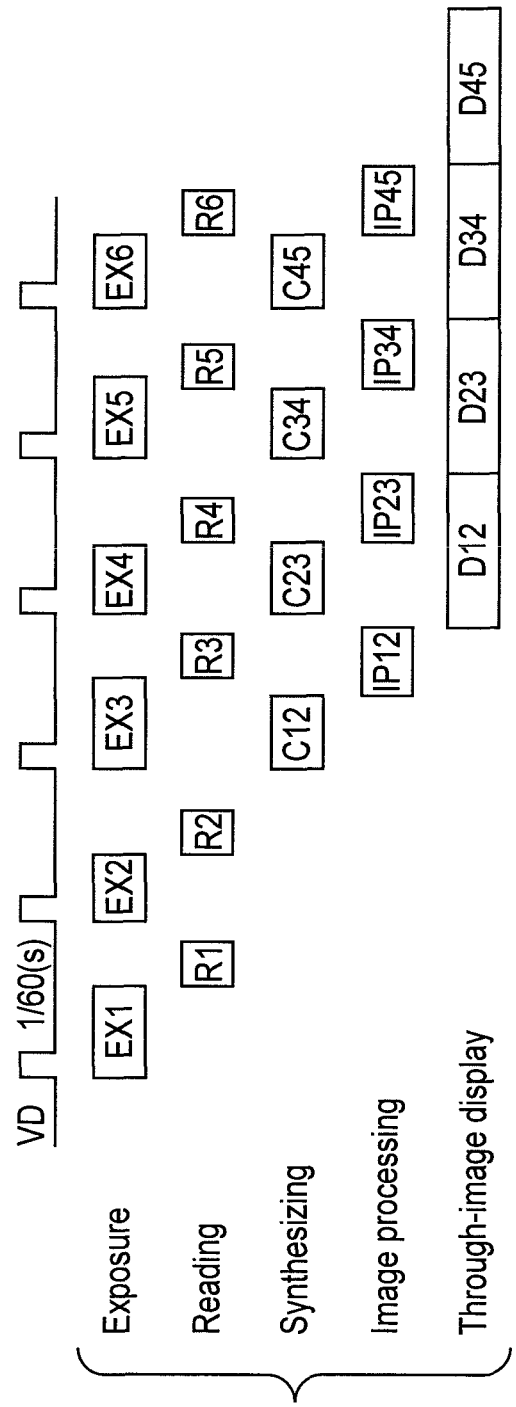
F I G. 12

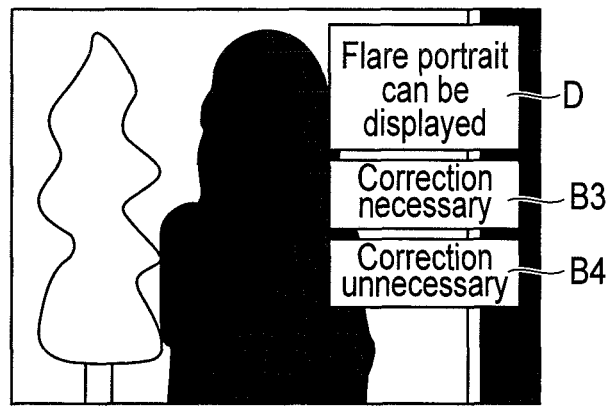
F I G. 14
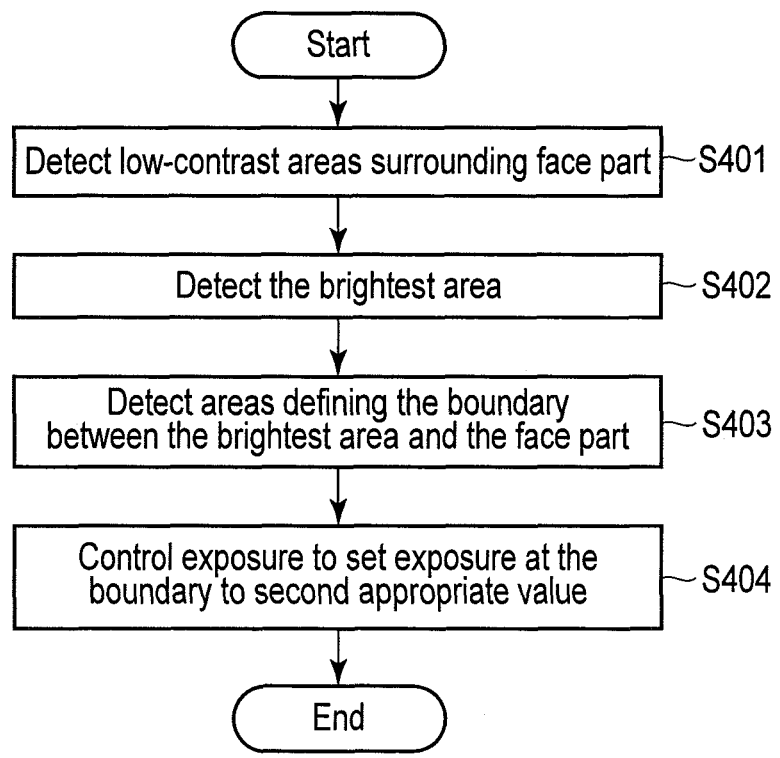
F I G. 15

IMAGING APPARATUS AND IMAGING METHOD FOR FLARE PORTRAIT SCENE IMAGING

CROSS-REFERENCE TO RELATED APPLICATIONS

This application is based upon and claims the benefit of priority from the prior Japanese Patent Application No. 2012-245382, filed Nov. 7, 2012, the entire contents of which are incorporated herein by reference.

BACKGROUND OF THE INVENTION

1. Field of the Invention

This invention relates to an imaging apparatus and an imaging method.

2. Description of the Related Art

In most imaging apparatuses such as digital cameras, the exposure value is controlled so that the subject photographed may acquire an appropriate exposure value (brightness). To photograph a backlighted scene, either the subject or the background must be set to an appropriate exposure value. However, even if one of these items is set to an appropriate exposure, the other may not have an appropriate exposure value in some cases. In technique of Jpn. Pat. Appln. KOKAI Publication No. 1-60156, photographing with different exposure values is repeatedly executed, and then the resultant images are synthesized. This technique can provide an image of a high dynamic range in which both the subject and the background have appropriate exposure values even in a backlighted scene.

BRIEF SUMMARY OF THE INVENTION

An imaging apparatus according to a first aspect of the invention comprises: an imaging unit including an imaging element, configured to perform photoelectric conversion on a light flux received at the imaging element and to generate image data; a main subject detecting unit configured to detect a main subject from the image data; and a control unit configured to compare an exposure value of the image data with a predetermined appropriate value and to perform an exposure control so that the exposure value for the main subject part in the image data changes to the appropriate value and the exposure value for a part excluding the main subject part in the image data changes to a value larger than the appropriate value.

An imaging method according to a second aspect of the invention comprises: acquiring image data in an imaging unit having an imaging element, by performing photoelectric conversion on a light flux received at the imaging element; detecting a main subject from the image data; comparing an exposure value of the image data with a predetermined appropriate value; and performing an exposure control so that the exposure value for the main subject part in the image data changes to the appropriate value and the exposure value for a part excluding the main subject part in the image data changes to a value larger than the appropriate value.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 3 is a block diagram showing the internal configuration of an image processing circuit;

FIG. 4 is a flowchart showing how the digital camera according to the first embodiment of the invention operates;

FIG. 6 is a diagram showing how the photographer is notified that the image is a flare portrait scene;

FIG. 7A is a diagram showing an example of a backlighted scene;

FIG. 7B is a diagram showing a brightness distribution along the chain line shown in FIG. 7A;

FIG. 9 is a diagram showing an exemplary control performed to provide a flare portrait image;

FIG. 11A is a diagram showing the brightness distribution in a flare portrait scene;

FIG. 11B is a diagram showing how an exposure control is performed for a flare portrait scene;

FIG. 12 is a timing chart showing how a through image is displayed in preparation for providing a flare portrait image by performing exposure several times;

FIG. 14 is a diagram showing how the photographer is notified that the scene is a flare portrait scene;

FIG. 15 is a flowchart showing how a modification 1 performs an exposure process in the flare portrait mode;

DETAILED DESCRIPTION OF THE INVENTION

Embodiments of the present invention will be described with reference to the accompanying drawings.

First Embodiment

Figure 1:
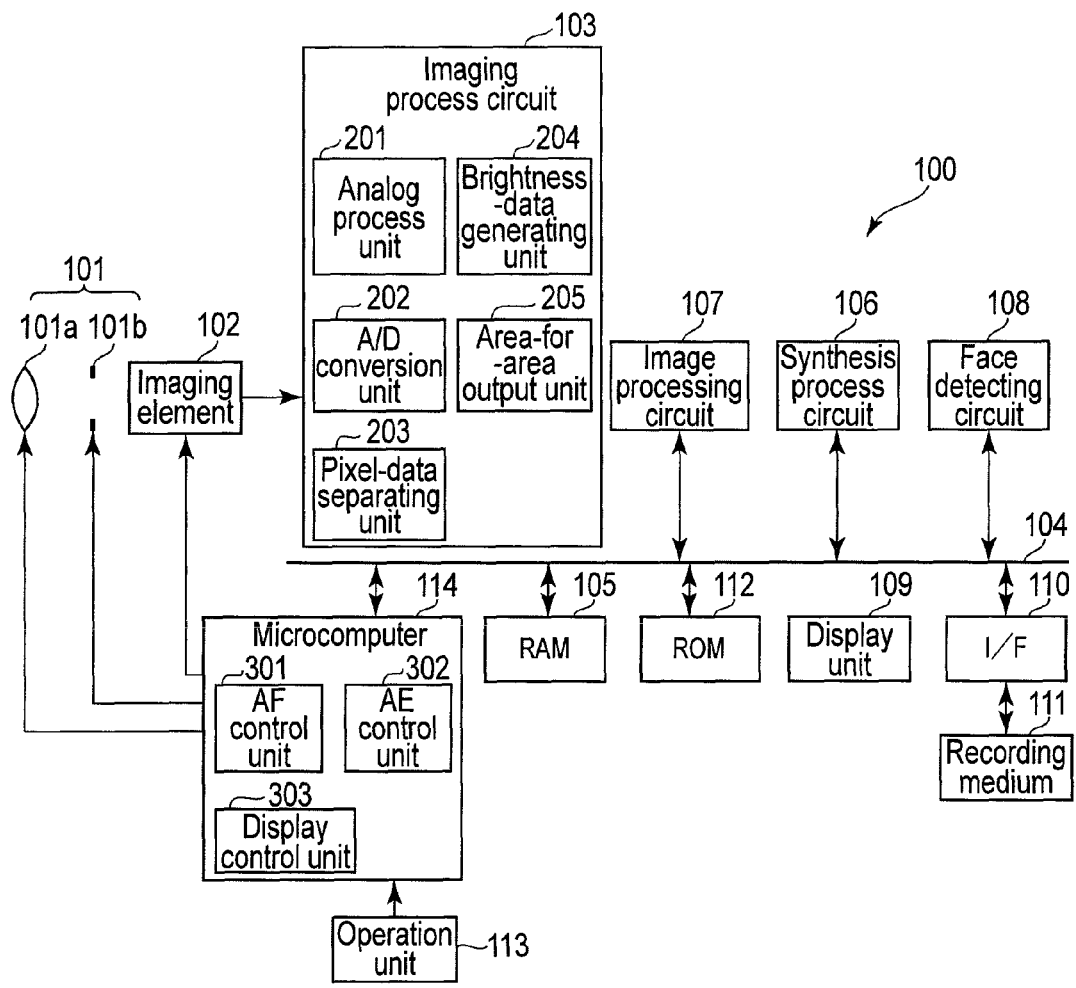
FIG. 1 is a block diagram showing the configuration of a digital camera that is one example of an imaging apparatus according to the first embodiment of this invention.

The first embodiment of this invention will be described. FIG. 1 is a block diagram showing the configuration of a digital camera 100 (hereinafter referred to as "camera") that is one example of an imaging apparatus according to the first embodiment of this invention. As shown in FIG. 1, the camera 100 includes a photographing optical system 101, an imaging element 102, an imaging process circuit 103, a bus 104, a RAM 105, a synthesis process circuit 106, an image processing circuit 107, a face detecting circuit 108, a display unit 109, an interface (I/F) 110, a recording medium 111, a ROM 112, a console unit 113, and a microcomputer 114.

The photographing optical system 101 includes a photographing lens 101a and a diaphragm 101b. The photographing lens 101a condenses the light flux coming from a subject (not shown) on the imaging element 102. The photographing lens 101a may be configured as an optical system that includes a focus lens and a zoom lens. The focus lens is a lens for adjusting the focal position of the photographing lens 101a. The zoom lens is a lens for adjusting the focal distance of the photographing lens 101a. The photographing lens 101a is constituted by a movable lens, which is driven along its optical axis as it is controlled by the microcomputer 114. The diaphragm 101b is configured to open and close, and adjusts the amount of light condensed on the imaging element 102 by the photographing optical system 101. The diaphragm 101b is driven as it is controlled by the microcomputer 114.

The imaging element 102 has a photoelectric conversion surface for receiving the light flux condensed by the photographing optical system 101. On the photoelectric conversion surface, pixels, i.e., photoelectric conversion elements (e.g., photodiodes) are arranged in a two-dimensional pattern, each configured to convert the light received to an electric charge. A color filter has, for example, a Bayer array, and is arranged on the photoelectric conversion surface. The imaging element 102 converts the light condensed by the photographing optical system 101 to an electric signal (image signal). The imaging element 102 is controlled by the microcomputer 114.

The imaging element 102 has a configuration known in the art, such as CCD type or CMOS type. The color filter has a color array selected from various arrays known in the art, such as the Bayer array. The imaging element 102 used in this embodiment is not limited to a specific configuration. Various types of imaging elements can be used in this embodiment.

The imaging process circuit 103 functions in the imaging unit together with the imaging element 102, and includes an analog processing unit 201, an A/D conversion unit 202, a pixel-data separating unit 203, a brightness-data generating unit 204, and an area-for-area output unit 205. The imaging process circuit 103 processes the image signal generated in the imaging element 102.

The analog process unit 201 performs various processes, such as a CDS process and AGC process, on the image signal input from the imaging element 102. In the CDS process, the dark-current noise component is removed from the image signal. In the AGC process, the image signal is amplified.

The A/D conversion unit 202 converts the image signal processed in the analog process unit 201 to image data that is digital data. The image data is composed of the pixel data items generated in the pixels of the imaging element 102. If the color filter array is the Bayer array, the image data will accord with the Bayer array. Hereinafter, any image data that accords with the Bayer array shall be referred to as "Bayer data."

The pixel-data separating unit 203 separates the Bayer data generated in the A/D conversion unit 202 into color-component data items. If the imaging element 102 has color filters arranged in the Bayer array, the pixel-data separating unit 203 separates the Bayer data generated in the A/D conversion unit 202 into three pixel data items R (red), G (green) and B (blue), or into four pixel data items R, Gr, Gb and B.

The brightness-data generating unit 204 generates brightness data from the R data, G data and B data acquired in the pixel-data separating unit 203. If the imaging element 102 has color filters arranged in the Bayer array, the brightness data is generated area for area, each area defined by, for example, four pixels (R, Gr, Gb and B) arranged in two rows and two columns. The brightness data is a mixture of four different-color pixel data items weighted by specific coefficients. In this case, the brightness data obtained is expressed as follows:

$$Y=(r{\times}R+gr{\times}Gr+gb{\times}Gb+b{\times}B)/(r+gr+Gb+b) \quad (1)$$

where R, Gr, Gb and B are the values of the pixels, respectively, r, gr, gb and b are coefficients.

The coefficients are, for example, 1.0 (r=gr=gb=b=1.0). Alternatively, r=0.3, gr=gb=0.5, and b=0.1, for example, in accordance with the color brightness. These coefficients according to the color brightness are no more than examples.

The value of G data may be regarded as brightness data. In the Bayer array, however, each area includes two G data items (Gr and Gb). The average value of Gr data and Gb data is therefore used as brightness data, as expressed by the following equation:

$$Y=(Gr+Gb)/2 \quad (2)$$

The area-for-area output unit 205 outputs, to the bus 104, the pixel data items separated for color components in the pixel-data separating unit 203 or the exposure data acquired by cumulating the brightness data the brightness-data generating unit 204 has generated for respective areas.

The bus 104 is a transfer path for transferring various data generated in the camera 100. The RAM 105 is a storage unit for temporary storage of the various data generated in the camera 100. The RAM 105 is used also as a buffer memory in processing data in the synthesis process circuit 106 or image processing circuit 107.

The synthesis process circuit 106 synthesizes the Bayer data items generated as the exposure process was performed several times. The synthesis process circuit 106 will be described later in detail.

The image processing circuit 107 performs various image processes on the Bayer data output from the area-for-area output unit 205 of the imaging process circuit 103, or the synthesized Bayer data generated in the synthesis process circuit 106.

The face detecting circuit 108, which functions as a part of the main subject detecting unit, detects a face part, or the main part of the image represented by the image data. To detect the face part, a known method such as local image-feature matching is used. Alternatively, the face detecting circuit 108 may store the facial feature data of each person, thereby detecting the face image of the person.

The display unit 109 is provided on, for example, the back of the camera 100, and is configured to display various images represented by the image data processed in the image processing circuit 107. The I/F 110 is an interface through which the microcomputer 114 performs data communication with the recording medium 111. The recording medium 111 is a medium for recording the image files acquired by photographing.

The ROM 112 stores a synthesis ratio table for use in the synthesis process circuit 106, image processing parameters for use in the image processing circuit 107, and various other parameters for driving the camera 100. In this embodiment, the ROM 112 stores two standard exposure values for achieving two types of exposure control, respectively. The ROM 112 further stores various programs the microcomputer 114 executes.

The operation unit 113 is a unit that the photographer may operate to make the camera 100 perform various functions. The operation unit 113 includes a release button, a mode button, a menu button, a reproduction button, and a power-supply button. Some or all of these buttons may be virtual buttons displayed on a touch panel. The release button is a two-stage switch composed of a first (1st) release switch and a second (2nd) release switch. If the 1st release switch is turned on while the release button remains half depressed, the microcomputer 114 performs an AE process and an AF process. If the 2nd release switch is turned on while the release button remains fully depressed, the microcomputer 114 performs an image recording process (i.e., photographing process).

If pushed, the mode button sets the camera 100 to an operating mode. The camera 100 according to this embodiment has at least two operation modes, i.e., photographing mode and reproducing mode. While being set to the photographing mode, the camera 100 can generate an image to record. While set to the reproducing mode, the camera 100 can reproduce the image recorded.

If pushed, the menu button instructs the display unit 109 to display a menu screen. The photographer may touch the menu screen, thereby changing the various items set in the camera 100. The photographing mode set in the camera 100 and detailed operating modes can be set on the menu screen.

The reproduction button may be pushed to instruct the microcomputer 114 to reproduce image files.

The power-supply button may be pushed to turn on or off the power supply of the camera 100.

The microcomputer 114 is a control unit configured to control the various operation sequences of the digital camera 100. If any member of the console unit 113 is operated, the microcomputer 114 controls the area associated with the member operated. In the present embodiment, the microcomputer 114 includes an AF control unit 301, an AE control unit 302, and a display control unit 303. The AF control unit 301 controls the AF process for focusing the photographing lens 101a on the subject of photography. The AE control unit 302 controls the AE process for adjusting the exposure value of the image data (Bayer data) acquired in the imaging element 102. The display control unit 303 controls the display unit 109, causing the same to display various types of images.

Figure 2:
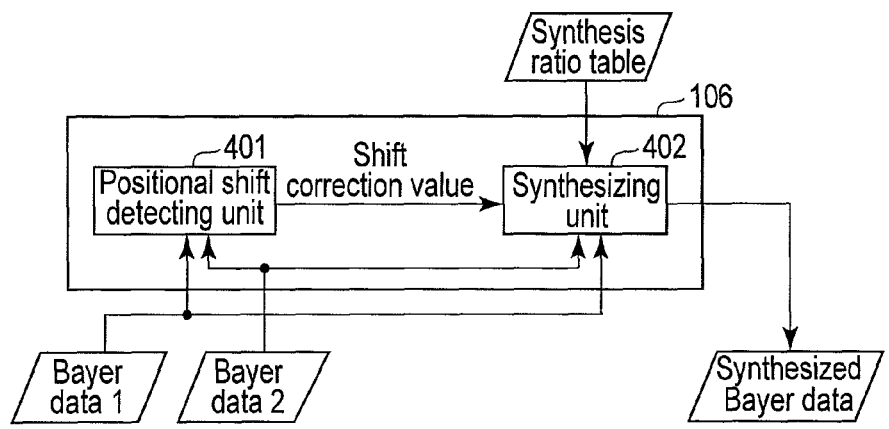
FIG. 2 is a block diagram showing the internal configuration of a synthesis process circuit.

FIG. 2 is a block diagram showing the internal configuration of the process circuit 106. As shown in FIG. 2, the synthesis process circuit 106 includes a positional shift detecting unit 401 and a synthesizing unit 402.

The positional shift detecting unit 401 detects the positional shift (i.e., shift between the images of a subject) between the Bayer data items acquired through several exposures performed (between Bayer data 1 and Bayer data 2, in the instance shown in FIG. 2). The positional shift is, for example, the motion vector between Bayer data 1 and Bayer data 2. The motion vector is calculated by a known method such as the matching of the Bayer data items.

The synthesizing unit 402 synthesizes Bayer data items which have been acquired at different exposure timings. If neither the camera 100 nor the subject moves at the exposure timing, no positional shift will occur between the Bayer data items. In most cases, however, either the camera 100 or the subject moves at the exposure timing, resulting in a positional shift between Bayer data items. If Bayer data items having a positional shift between them are synthesized, the resultant image may be composed of two images shifted with respect to each other. Therefore, the positional shift between the Bayer data items is corrected before the synthesizing unit 402 synthesizes the Bayer data items. A correction value for correcting the positional shift is calculated in the positional shift detecting unit 401.

In the case shown in FIG. 2, two Bayer data items are input to the synthesis process circuit 106 and the positional shift between the two data items is detected. If the synthesizing unit 402 synthesizes three or more Bayer data items, the positional shift detecting unit 401 detects the positional shift between the three or more Bayer data items.

The synthesizing unit 402 synthesizes the pixel data items corresponding to the Bayer data items input to it, in accordance with the synthesis ratio acquired from the synthesis ratio table. The synthesizing unit 402 synthesizes the pixel data items, after the positional shift between the Bayer data items has been corrected in accordance with the shift correction value calculated in the positional shift detecting unit 401.

FIG. 3 is a block diagram showing the internal configuration of the image processing circuit 107. As shown in FIG. 3, the image processing circuit 107 includes a noise reducing (NR) unit 501, a white balancing (WB) unit 502, a synchronizing unit 503, a color converting unit 504, a gradation converting unit 505, a YC converting unit 506, an edge extracting unit 507, an edge emphasizing unit 508, an edge synthesizing unit 509, a resizing unit 510, a compressing unit 511, an expanding unit 512, and an amplifying unit 513.

The NR unit 501 reads Bayer data from the RAM 105 and performs noise reduction on the Bayer data, thereby removing high-frequency noise, etc. The noise reduction is achieved by using, for example, a coring process.

The WB unit 502 performs a white-balance correction, thereby correcting the white balance of the Bayer data processed by the NR unit 501. The white-balance correction is achieved by, for example, multiplying the pixel data by the gain value (i.e., white-balance gain) for each color component.

The synchronizing unit 503 performs interpolation on the Bayer data in which each pixel output from the WB unit 502 has a color component R, G or B, thereby converting the Bayer data to image data (RGB data) having three color components; R, G and B.

The color converting unit 504 performs a color conversion, thereby reproducing the color of an image appropriately. The color conversion may be, for example, color matrix calculation. The color matrix calculation is a process of multiplying the RGB data by the color matrix coefficient that accords with, for example, the white balance. The color converting unit 504 further corrects chroma and hue.

The gradation converting unit 505 performs a gradation conversion on the RGB data output from the color converting unit 504. The gradation conversion is a process of converting the RGB data by using a predetermined gradation conversion table, thereby correcting the gradation of the image.

The YC converting unit 506 converts the RGB data output from the gradation converting unit 505, to YC data (i.e., brightness-color difference data). The RGB data is converted to YC data by multiplying the RBG data by a predetermined brightness-color difference matrix.

The edge extracting unit 507 performs, for example, band-pass filtering on the Bayer data output from the NR unit 501, extracting an edge component signal. The edge emphasizing unit 508 receives the edge component signal extracted by the edge extracting unit 507, and multiplies the edge component signal by an edge emphasis coefficient. The edge synthesizing unit 509 receives the edge component signal from the edge emphasizing unit 508, and adds the edge component signal to the brightness (Y) data acquired in the YC converting unit 506, thereby emphasizing the edge component in the image.

The resizing unit 510 resizes the edge-emphasized brightness (Y) data output from the edge synthesizing unit 509 and the color difference (C) data acquired in the YC converting unit 506, so that both the edge-emphasized brightness (Y) data and the color difference (C) data may be appropriately recorded and displayed.

The compressing unit 511 compresses the YC data resized in the resizing unit 510, and stores the image data compressed (compressed image data) in the RAM 105. If a still image is photographed, the compressing unit 511 uses, for example, the known JPEG system, to compress the YC data. If a moving picture is photographed, the compressing unit 511 uses, for example, the known MPEG system, to compress the YC data.

The expanding unit 512 expands the compressed image data contained in an image file, and stores the image data expanded image data (YC data) in the RAM 105. If the compressed data has been generated by the JPEG system, the expanding unit 512 uses the JPEG system, expanding the compressed image data. If the compressed data has been generated by the MPEG system, the expanding unit 512 uses the MPEG system, expanding the compressed image data.

The amplifying unit 513 amplifies the image data (YC data). The amplifying unit 513 is used to achieve exposure correction.

How the camera 100 described above operates will be explained. FIG. 4 is a flowchart showing the operation of the camera 100 according to the first embodiment.

If the power switch on the camera 100 is turned on, the operation sequence shown in FIG. 4 is started. At the time the operation sequence starts, the microcomputer 114 determines whether the camera 100 is set to the photographing mode or not (Step S101).

In Step S101, the operating mode may be found to be photographing mode. In this case, the microcomputer 114 performs exposure control in order to display a through image (Step S102). In the exposure process, the microcomputer 114 controls the exposure value of the face part detected by the face detecting circuit 108, changing the exposure value to a first appropriate value. In order to change the exposure value, the microcomputer 114 inputs the image data (Bayer data or YC data) to the face detecting circuit 108, and causes the face detecting circuit 108 to detect the face part. Then, the microcomputer 114 sets exposure conditions (i.e., aperture opening of the diaphragm 101b, the exposure time for the imaging element 102, etc.), changing the exposure value of the face part detected by the face detecting circuit 108, to the first appropriate value. The microcomputer 114 controls the diaphragm 101b and the imaging element 102 in accordance with the exposure conditions. As a result, the face part of the image represented by the Bayer data acquired in the imaging element 102 comes to have the first appropriate value. The first appropriate value is, for example, an exposure value obtained by using, for example, 18% gray as a reference.

After the exposure performed to display a through image, the microcomputer 114 operates to display the through image (Step S103). First, the microcomputer 114 causes the image processing circuit 107 to process the Bayer data acquired by photographing and sequentially stored in the RAM 105. The image processing circuit 107 performs the NR process to resizing process, acquiring the YC data. The YC data so acquired is stored in the RAM 105. Thereafter, the microcomputer 114 reads the YC data from the RAM 105, and inputs the YC data to the display unit 109. The display unit 109 displays the image represented by the YC data. As this operation sequence proceeds, the photographer can view the image displayed by the display unit 109, to confirm the state of the subject of photography.

After the display unit 109 has displayed the through image, the microcomputer 114 determines whether the 1st release switch is on or not (Step S104). If the 1st release switch is not on in Step S104, the process returns to Step S101.

If the 1st release switch is found on in Step S104, the microcomputer 114 performs the AF action (Step S105). In the AF process, the microcomputer 114 cumulates the Bayer data acquired from the imaging element 102, thereby acquiring a focus evaluation value. The microcomputer 114 uses the focus evaluation value, evaluating the image contrast, and minutely drives the focus lens of the photographing lens 101a. When the image contrast becomes maximal thereafter, the microcomputer 114 ceases to drive the focus lens. This AF process is called "contrast-type AF process." The AF process may be replaced by a phase-difference AF process. Before the AF process is performed, the face detecting circuit 108 detects the face part of the image. The focus lens may be driven to bring the face part into focus.

After performing the AF process, the microcomputer 114 performs the AE process. In this embodiment, two types of AE process are interchangeably performed in accordance with the relation between the brightness of the face part and the brightness of the background part. One type is an AE process using an exposure control reference that is the exposure value obtained by using 18% gray as a reference. The other type is an AE process using an exposure control reference that is greater than the exposure value obtained by using 18% gray as a reference. The reference can, of course, be changed from 18% gray in prescribed conditions.

The microcomputer 114 acquires the face-part exposure data Ef from the imaging process circuit 103 (Step S106) in order to determine which AE process should be performed. More specifically, the microcomputer 114 calculates the face-part exposure data Ef from the brightness data about the face part detected by the face detecting circuit 108.

Figure 5A:
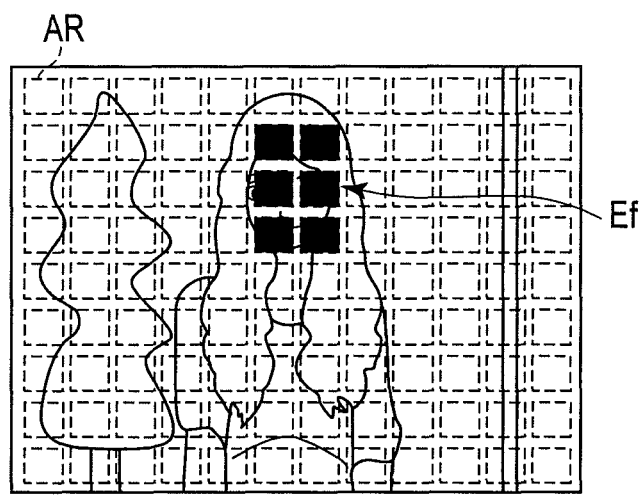
FIG. 5A is a diagram showing the exposure data of a face part.

FIG. 5A is a diagram showing the exposure data Ef of a face part. As shown in FIG. 5A, the Bayer data is divided into 12×9 areas ARs. The exposure data is acquired for each area AR. The exposure data for one area AR is obtained by cumulating the brightness data acquired in the area AR. The exposure data Ef of the face part has been acquired from the areas (i.e., black areas) constituting the face part. The method of acquiring the exposure data, described here, is no more than an example. Any other method may be used to acquire the exposure data Ef.

Then, the microcomputer 114 acquires the exposure data Es of the background part from the imaging process circuit 103 (Step S107). More precisely, the microcomputer 114 generates the exposure data Es of the background part from that part of the brightness data generated in the brightness-data generating unit 204 which corresponds to the background part.

Figure 5B:
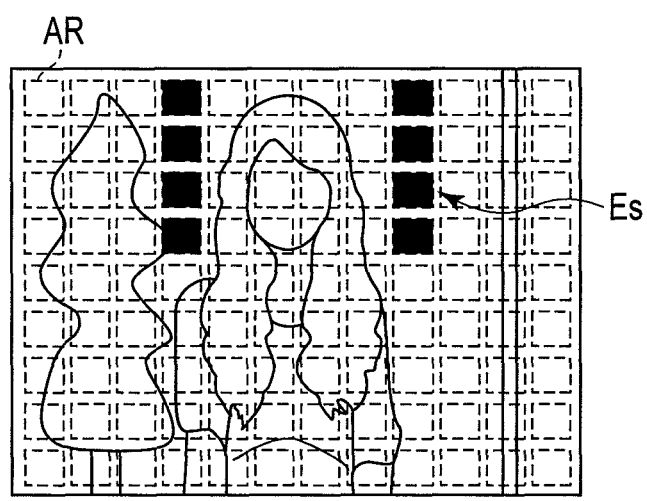
FIG. 5B is a diagram showing the exposure data of a background part.

FIG. 5B is a diagram showing the exposure data Es of the background part. The exposure data Es is that part of the exposure data acquired for areas ARs from the area-for-area output unit 205 which is associated with the areas (i.e., black areas in FIG. 5B) constituting the background part. The "background part" is composed of areas remote from the areas constituting the face part, by at least a specific number of areas, and having almost uniform brightness different from the brightness of the face part. The background part may be composed of all areas other than the face-part areas.

After acquiring the exposure data Ef and the exposure data Es, the microcomputer 114 calculates the difference $\Delta E$ between the exposure data Es of the background part and the exposure data Ef of the face part, i.e., $\Delta E = Es - Ef$ (Step S108). The microcomputer 114 then determines whether $\Delta E$ is greater than threshold value Th (Step S109). The threshold value Th is used to determine whether the photographed scene is a flare portrait scene or not. The threshold value Th is set at the time of, for example, designing the camera 100, and then stored in the ROM 112. The flare portrait scene is a scene including any backlighted subject (e.g., backlighted face part). Flare is unnecessary light, such as diffused reflection and stray light in the optical system. If the subject is backlighted, flare will appear in the image in many cases, making a special photographic effect in few cases. In view of this, flare is generally undesirable light. In this embodiment, however, flare is utilized to provide a picture in which light appears as if scattered.

If $\Delta E$ is found greater than Th in Step S109, showing that the scene is a flare portrait scene, the microcomputer 114 informs the photographer that the scene is a flare portrait scene (Step S110).

FIG. 6 is a diagram showing how the photographer is notified that the image is a flare portrait scene, by using a display. More specifically, the microcomputer 114 causes the display unit 109 to display the letter D, informing the photographer that the image is a flare portrait scene. At the same time, the microcomputer 114 causes the display unit 109 to display selection buttons B1 and B2. The selection buttons B1 and B2 are an OK button and an NG button, respectively, in the instance of FIG. 6. If the selection button B1 is touched, flare portrait photography is selected. "Flare portrait photography" is a coined term, which means photography scattered light is utilized to apply a special effect to the portrait image.

The notification may be achieved not only by displaying it on the display unit 109, but also by blinking an LED and/or generating a voice message.

After notifying the photographer that the image is a flare portrait scene, the microcomputer 114 determines whether the flare portrait should be photographed or not (Step S111). In Step S111, the microcomputer 114 determines that the flare portrait should be photographed if the selection button B1 has been selected, and that the flare portrait should not be photographed if the selection button B2 has been selected.

The microcomputer 114 may determine, in Step S111, that the flare portrait should be photographed. In this case, the microcomputer 114 sets the photographing mode to the flare portrait mode, thereby to perform the exposure process (Step S112). In the exposure process, the microcomputer 114 controls the exposure value of the face part detected by the face detecting circuit 108, changing the exposure value to the second appropriate value that is greater than the first appropriate value. The microcomputer 114 inputs the image data (i.e., Bayer data or YC data) to the face detecting circuit 108 and causes the face detecting circuit 108 to detect the face part. The microcomputer 114 then sets the exposure conditions (i.e., the aperture opening of the diaphragm 101b and the exposure time of the imaging element 102), thereby changing the exposure value of the face part detected by the face detecting circuit 108 to the second appropriate value. As the microcomputer 114 controls the diaphragm 101b and the imaging element 102, the exposure value of the face part of the image represented by the Bayer data acquired in the imaging element 102 becomes the second appropriate value. How the exposure control is performed will be later explained in detail.

The result of the exposure process so performed is applied to the through image (Step S113). Then, the microcomputer 114 determines whether the 2nd release switch is on or not (Step S114). If the 2nd release switch is not on in Step S114, the process returns to Step S104. Thus, if the 2nd release switch is not on, while the 1st release switch is on, the AF process and the AE process will be continued.

If the 2nd release switch is found on in Step S114, the microcomputer 114 performs the photographing process (Step S115). After the photographing process has been performed, the process returns to Step S101. In the photographing process, the microcomputer 114 controls the diaphragm 101b and the imaging element 102 in accordance with the exposure condition (either for appropriating the exposure value of the face part or for the flare portrait mode). The Bayer data acquired in the imaging element 102 is stored in the RAM 105. The image processing circuit 107 reads the Bayer data from the RAM 105 and processes the data, first reducing noise in the NR unit 501, and finally compressing the data in the compressing unit 511. The data compressed is stored in the RAM 105. Thereafter, the microcomputer 114 applies predetermined header data to the compressed image data, generating an image file. The image file is recorded in the recording medium 111. The header data is composed of various data items such as file name, file size, and exposure conditions for photographing.

If $\Delta E$ is equal to or smaller than Th in Step S109, the microcomputer 114 determines whether the present photographing mode is the flare portrait mode (Step S116). If the present photographing mode is determined to be the flare portrait mode in Step S116, the process 114 goes to Step S110. In the flare portrait mode, both the face part and the background part have the exposure values close to the saturation level of the imaging element 102. As a result, $\Delta E$ may become equal to or smaller than Th. In this embodiment, once process of Step 116 has been performed and the exposure control has been thereby performed in the flare portrait mode, the exposure control can be continued in the flare portrait mode until the photographer selects non-flare portrait photographing.

The microcomputer 114 may determine in Step S111 that the flare portrait should not be photographed, or may determine in Step S116 that the present photographing mode is not the flare portrait mode. In this case, the microcomputer 114 performs an exposure process using the first appropriate value for the face part of the subject (Step S117). In this exposure process, the microcomputer 114 changes the exposure value of the face part to the predetermined first appropriate value. Thereafter, the process goes to Step S113.

If the microcomputer 114 determines in Step S101 that the operating mode is not the photographing mode, it determines whether the operating mode is the reproducing mode (Step S118). The operating mode may be found, in Step S101, not to be the reproducing mode. In this case, the process returns to Step S101.

If the microcomputer 114 determines in Step S118 that the operating mode is the reproducing mode, it makes the camera 100 operate in the reproducing mode. The reproducing mode will be briefly explained. In the reproducing mode, the microcomputer 114 causes the display unit 109 to display the list of the image files stored in the recording medium 111. If the photographer selects a desirable image file and pushes the reproduction button, the microcomputer 114 reads the compressed image data from the image file selected, and inputs the compressed image data to the image processing circuit 107. The image processing circuit 107 expands the compressed image data. The image data expanded (YC data) is input to the display unit 109. The display unit 109 displays the image represented by the image data.

The exposure control performed in the flare portrait photographing mode of this embodiment will be further explained. As described above, the exposure control in the flare in this embodiment can be performed for a scene including a backlighted subject (i.e., face part). FIG. 7A is a diagram showing an example of a backlighted scene. FIG. 7B is a diagram showing a brightness distribution along the chain line shown in FIG. 7A. As seen from FIG. 7B, the background part S has higher brightness than the face part F.

The A/D conversion unit 202 has a brightness range called "dynamic range," in which the A/D conversion can be performed. The dynamic range is shown as "DR" in FIG. 7B. Image signal having brightness higher than the maximum value DRH for the dynamic range and image signal having brightness lower than the minimum value DRL are clipped to the maximum value DRH and minimum value DRL of the dynamic range DR, respectively.

Figure 8A:
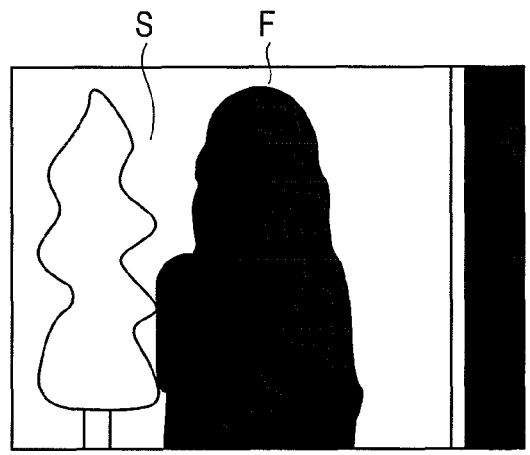
FIG. 8A is a diagram showing a face part that is a crushed shadow.
Figure 8B:
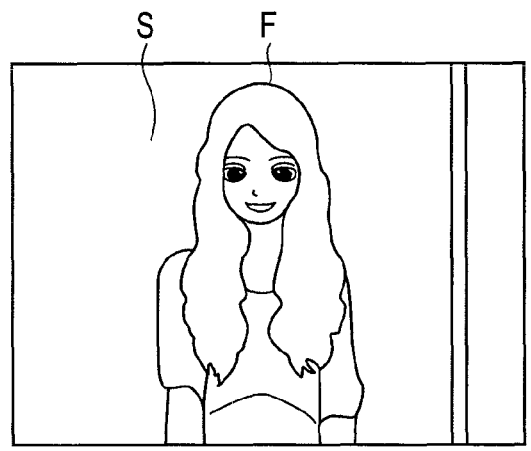
FIG. 8B is a diagram showing a background that is clipped white.

Assume that the brightness of the background part S is exposure-controlled to fall within the dynamic range DR in the case where the face part is photographed in a backlighted scene. Then, the brightness of the face part F, which is less bright than the background part S, will become even lower, and the image of the face part F may appear as a crushed shadow as shown in FIG. 8A. Conversely, the brightness of the background part S, which is brighter than the face part, will become even higher, and the image of the background part S may appear clipped white as shown in FIG. 8B.

Figure 8C:
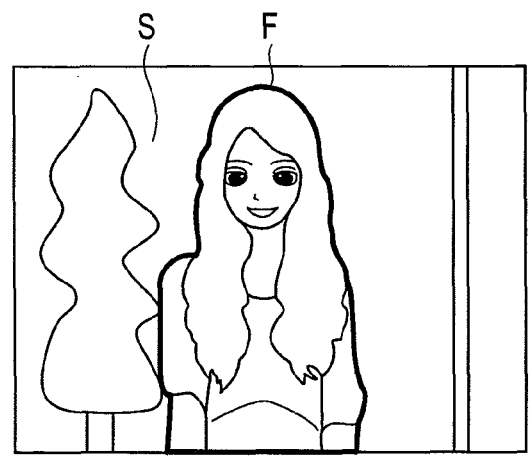
FIG. 8C is a diagram showing an image processing for providing an image of a high dynamic range.

In recent years, an image synthesizing technique has been developed. In this technique, an image exposure-controlled as shown in FIG. 8A and an image exposure-controlled as shown in FIG. 8B are synthesized to provide an image of high dynamic range, which is free of crushed shadow and clipped white as shown in FIG. 8C. The synthesized image may, however, appear unnatural in some cases.

This embodiment can accomplish flare portrait photographing to provide a photograph in which the subject looks bright even in a bright background, thus mirroring the photographer's taste. More precisely, the exposure control is performed for a flare portrait scene as shown in FIG. 9, in order to set the exposure value of the face part to the second appropriate value E2 that is greater than the first appropriate value E1. The second appropriate value E2 is, for example, the maximum value DRH for the dynamic range DR.

As explained above, this embodiment can perform an automatic exposure control on a high-key image (i.e., flare portrait image) desirable as a backlighted-scene portrait, by setting the exposure value of the face part greater than that of the background part, as shown in FIG. 9. (Any scene not completely backlighted, but backlighted in part or backlighted obliquely, shall herein be called a "backlighted scene".) The automatic exposure control can result in a soft and mysterious image of a person embraced in light. In this embodiment, a photograph is desirable in which the scattered light looks white and the face image appears in the scattered light. To make the face image appear like this, the exposure value is so selected that the background may look as white as possible, while preventing the face part from appearing as clipped white or crushed shadow. Moreover, the exposure level may be held in an appropriate range since any change in color balance is undesirable and the face image is important. As long as the exposure level remains in the appropriate range, the facial expression and the parts of the face can be recognized in the image and the color balance never greatly deviates from the color of the subject. Even an image not entirely bright, or locally bright, can be called a "high-key image." If the brightness difference is large, the background looks bright and the face looks bright at one part and dark at the other parts. Such an image is considered a flare portrait. In this embodiment, the main subject of photography is the face of a man. Nonetheless, the entire face part need not be set to a predetermined exposure level. The part of the image which surrounds the face might look better if it were clipped white or crushed shadow, providing an impressive image in some cases. Hence, the main subject can be regarded as a part composed of the main parts of a face, i.e., eyes, nose and mouth. It is therefore not absolutely unnecessary to expose the corners of the face appropriately. This expands the range of possible scenes. Further, flowers, accessories and statues, which are better embraced in light, may be handled as main subjects.

If the exposure is controlled as shown in FIG. 9, flare may be more easily generated around the face. The flare generating rate is raised in this embodiment, thereby providing images more desirable for a backlighted scene.

As in FIG. 9, the second appropriate value E2 is the maximum value DRH for the dynamic range. Nonetheless, the second appropriate value E2 may range from the first appropriate value E1 to the maximum value DRH for the dynamic range. An exposure value capable of achieving the best possible photographic effect may be obtained through experiments and may be stored in the ROM 112 as the second appropriate value E2.

In this embodiment, a backlighted scene including the image of a person's face is considered a flare portrait scene. Nonetheless, the main subject in a flare portrait scene is not necessarily the face of a person. It suffices to incorporate, in the camera 100, a circuit configured to detect the main subject.

Second Embodiment

The second embodiment of this invention will be described. In the first embodiment, an exposure control of the flare portrait mode is performed on a backlighted scene having a large brightness difference between the face part and the background part, and an ordinary exposure control is performed on a backlighted scene having a small brightness difference between the face part and the background part, thereby adjusting the exposure value of the face to an appropriate one. By contrast, the second embodiment is designed to provide an image of the same quality as that acquired through the exposure control of the flare portrait mode, even in a backlighted scene that has no sufficient brightness difference between the background part and the fact part. The second embodiment is identical to the first embodiment, in terms of the configuration of the camera 100 and the configuration of the image processing circuit 107. Therefore, the configurations of the camera 100 and image processing circuit 107 of the second embodiment will not be described.

Figure 10:
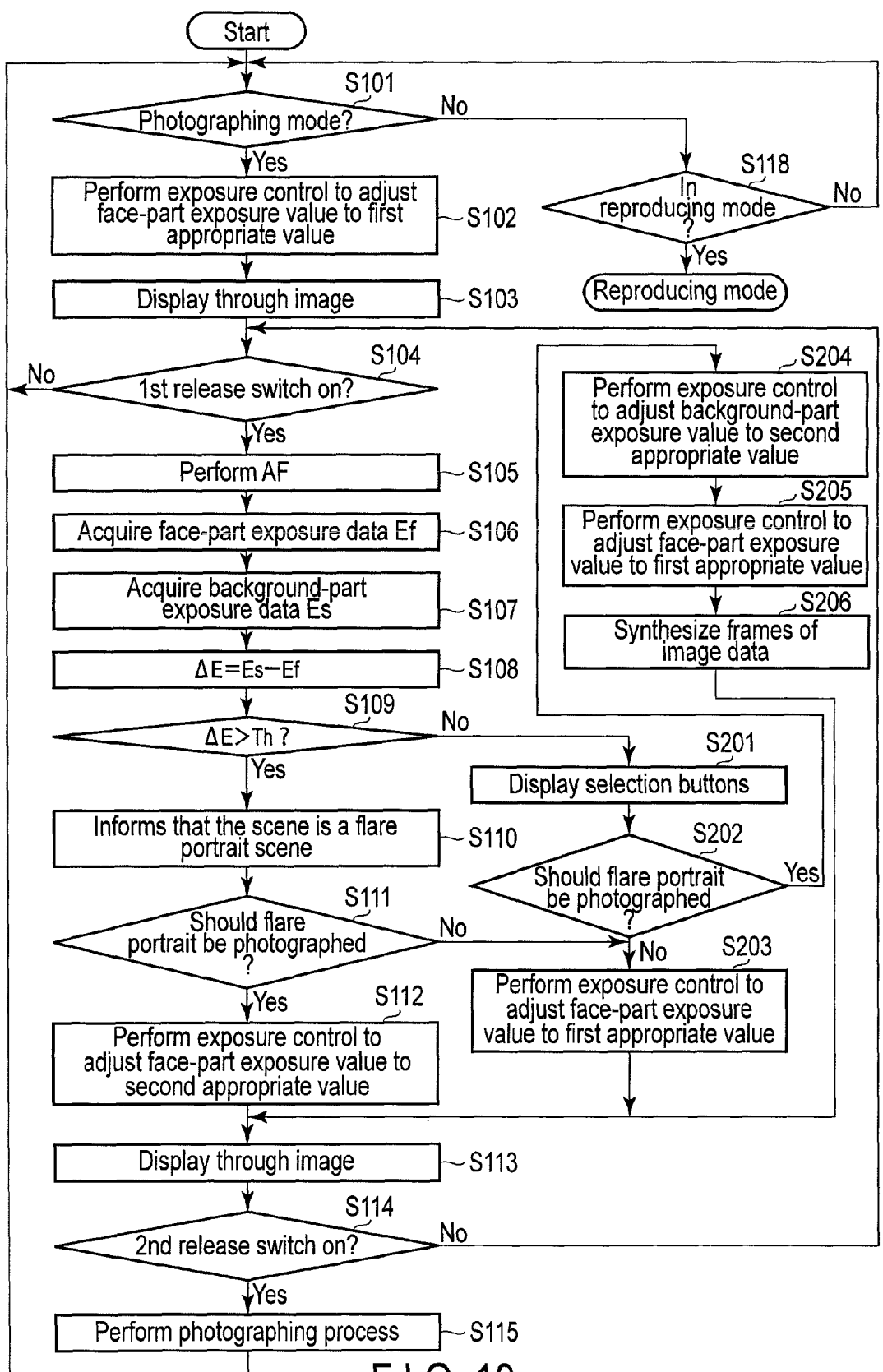
FIG. 10 is a flowchart showing how the digital camera according to a second embodiment of the invention operates.

FIG. 10 is a flowchart showing how the digital camera 100 of the second embodiment operates. The steps identical to those performed in the first embodiment are designated by the same numbers as in FIG. 4 and will not be described. That is, Steps S101 to S115 and Step S118 will not be described.

In Step S109, ΔE may be found equal to or smaller than Th. In this case, the microcomputer 114 causes the display unit 109 to display the selection buttons B1 and B2 as shown in FIG. 6 (Step S201). Then, the photographer may select the selection button B1 or the selection button B2. Since the scene is not a flare portrait scene, character D for notifying a flare portrait scene need not be displayed.

After displaying the buttons B1 and B2 at the display unit 109, the microcomputer 114 determines whether the flare portrait photographing should be performed or not (Step S202). This decision is made in the same way as in Step S111.

If the microcomputer 114 determines in Step S202 that the flare portrait photographing should not be performed, it performs an exposure process, using the exposure value of the face part of the subject as a first appropriate value (Step S203). In this exposure process, the microcomputer 114 adjusts the exposure value of the face part detected by the face detecting circuit 108 to a predetermined first appropriate value. Thereafter, the process goes to Step S113.

In Step S202, the microcomputer 114 may determine that the flare portrait photographing should be performed. In this case, the microcomputer 114 controls the exposure value of the background part, rendering the same greater than the second appropriate value (Step S204). The background part is composed of areas having almost uniform brightness different from that of the face part, as explained with reference to FIG. 5B. In the second embodiment, the second appropriate value is, for example, an exposure value smaller than the maximum value DRH for the dynamic range DR.

Then, the microcomputer 114 performs a control, adjusting the exposure value of the face part detected by the face detecting circuit 108, to the second appropriate value (Step S205). Step S205 is similar to Step S112.

The microcomputer 114 then acquires image data (Bayer data) in which the exposure value of the background part is greater than the second appropriate value, and also the image data (Bayer data) in which the exposure value of the face part is equal to the second appropriate value. Thereafter, the microcomputer 114 causes the synthesis process circuit 106 to synthesize these two frames of image data (Step S206). Then, the process goes to Step S113. In the synthesis process, the Bayer data acquired in Step S205 is subjected to the synthesis for the face-part areas, and the Bayer data acquired in Step S204 is subjected to the synthesis for the background-part areas. This data synthesis can provide an image comparable with a flare portrait image, even if the background is dark.

Photographing may be performed in Step S115 after the processes of Steps S204 to S206 have been performed. In this case, the image data items acquired by performing the exposure process several times as in Steps S204 to S206 are synthesized, thereby generating image data. The image data so generated is processed in the image processing circuit 107 and then recorded in the recording medium 111.

The exposure control performed in the flare portrait photographing in Steps S204 to S206 will be explained. As described above, the exposure control is performed in Steps S204 to S206 for such a scene as shown in FIG. 11A, in which the face part F is brighter than the background part S. Since the face part F is brighter than the background part S in this scene, the exposure value of the background part S never exceeds the exposure value of the face part F even if the exposure control is performed in the same way as in the flare portrait photographing performed in the first embodiment. Consequently, an image of the same quality as attained in the first embodiment cannot be provided.

In this embodiment, as shown in FIG. 11B, an exposure control is performed changing to the exposure value of the background part to a value greater than the second appropriate value and another exposure control is performed changing the exposure value of the face part to the second appropriate value. The two images acquired by these exposure controls, respectively, are synthesized, providing a flare portrait image even if the background part is darker than the face part in the scene.

In the instance of FIG. 10, the image is a through image having ΔE equal to or smaller than Th and acquired prior to the flare portrait photographing, and two times of exposure processes are performed. In practice, however, it suffices to perform the exposure process only once on one frame of the image to be displayed.

FIG. 12 is a timing chart showing how a through image is displayed in preparation for providing a flare portrait image in such a modified embodiment. The exposure process for displaying the through image is performed in accordance with a sync signal VD. In the modified embodiment, two types of exposure processes are alternately repeated, one for an exposure time and the other for another exposure time. In exposure process EX1, EX3 and EX5, the exposure value of the background part is greater than the second appropriate value, as controlled in Step S204 (FIG. 10). In the exposure process EX2, EX4 and EX6, the exposure value of the face part is the second appropriate value, as controlled in Step S205 (FIG. 10).

After these exposure processes have been performed, the imaging process circuit 103 reads the image signal. In FIG. 12, R1 is the data reading after the exposure process EX1, R2 is the data reading after the exposure process EX2, R3 is the data reading after the exposure process EX3, R4 is the data reading after the exposure process EX4, R5 is the data reading after the exposure process EX5, and R6 is the data reading after the exposure process EX6.

The Bayer data items read for the respective frames are synthesized in the synthesis process circuit 106. In this embodiment, the Bayer data items for two immediately preceding frames are synthesized. Thus, the synthesis is sequentially performed, starting after the data reading R2 for the second frame. As shown in FIG. 12, synthesis C12 is performed after the data reading R2, synthesizing the Bayer data items for the first and second frames. After the data reading R3, synthesis C23 is performed, synthesizing the Bayer data items for the second and third frames. After the data reading R4, synthesis C34 is similarly performed, synthesizing the Bayer data items for the third and fourth frames. After the data reading R5, synthesis C45 is performed, synthesizing the Bayer data items for the fourth and fifth frames. After the Bayer data items for every two consecutive frames have been synthesized, the image data is processed in the image processing circuit 107. In the instance of FIG. 12, image processing IP12 is performed after the synthesis C12, image processing IP23 is performed after the synthesis C23, image processing IP34 is performed after the synthesis C34, and image processing IP45 is performed after the synthesis C45.

After the image data has been so processed, an image (through image) is displayed. As shown in FIG. 12, image displaying D12 is performed after the image processing IP12, image displaying D23 is performed after the image processing IP23, image displaying D34 is performed after the image processing IP34, and image displaying D45 is performed after the image processing IP45. As shown in FIG. 12, the image displaying starts after the exposure has been performed on the third frame.

Third Embodiment

The third embodiment of this invention will be described. In the first and second embodiments, the exposure control is performed in the photographing mode, thereby acquiring a high-key image (i.e., flare portrait image) desirable for a backlighted scene. In the third embodiment, the exposure correction performed in the reproducing mode is utilized to acquire an image having photographic effects comparable with those of the flare portrait image. The third embodiment is identical to the first embodiment in terms of the configuration of the camera 100 and the configuration of the image processing circuit 107. Therefore, the configurations of the camera 100 and image processing circuit 107 of the third embodiment will not be described.

Figure 13:
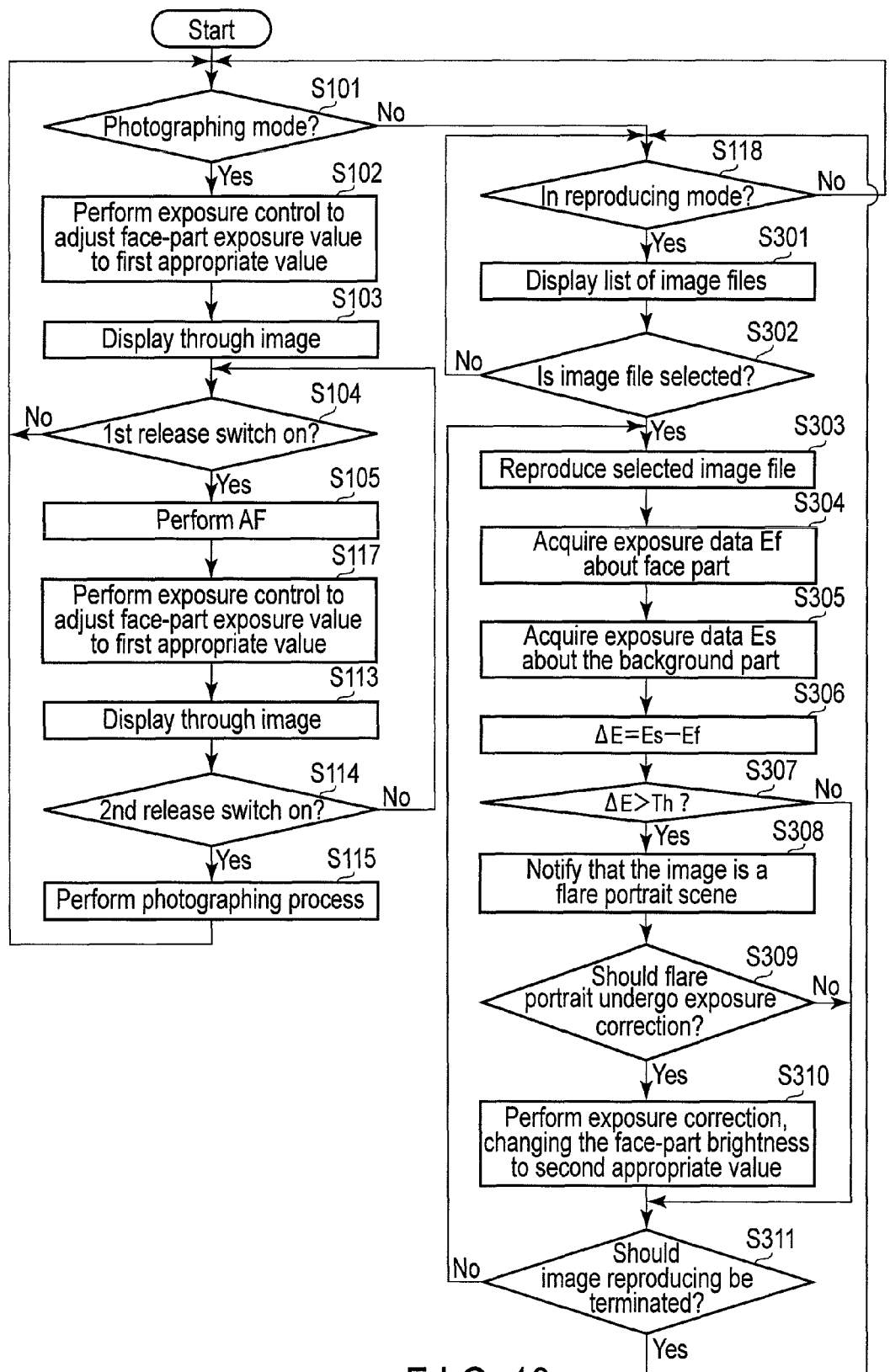
FIG. 13 is a flowchart showing how the digital camera according to a third embodiment of the invention operates.

FIG. 13 is a flowchart showing how the digital camera according to a third embodiment of the invention operates. The steps identical to those performed in the first embodiment are designated by the same numbers as in FIG. 4 and will not be described. That is, Steps S101 to S105, Step S117, Steps S113 to S115 and Step S118 will not be described.

In Step S118, the operating mode may be found to be the reproducing mode. In this case, the microcomputer 114 operates in the reproducing mode. In the third embodiment, the microcomputer 114 causes the display unit 109 to display the list of the image files stored in the recording medium 111 (Step S301). Thereafter, the microcomputer 114 determines which image file in the list displayed has been selected by the photographer (Step S302).

In Step S302, an image file may be found to have been selected. In this case, the microcomputer 114 reproduces the image file selected (Step S303). More specifically, the microcomputer 114 reads the compressed image data and inputs the same to the image processing circuit 107. The image processing circuit 107 expands the compressed image data, generating image data (YC data). The image data (YC data) is stored in the RAM 105. Thereafter, the microcomputer 114 inputs the image data stored in the RAM 105, to the display unit 109. The display unit 109 displays the image represented by the image data.

After reproducing the image file, the microcomputer 114 acquires the exposure data Ef about the face part in the image file reproduced (Step S304). Thereafter, the microcomputer 114 acquires the exposure data Es about the background part in the image file (Step S305). The face part and the background part assume such positions as has been explained with reference to FIG. 5A and FIG. 5B.

After acquiring the exposure data Ef and the exposure data Es, the microcomputer 114 calculates the difference ΔE between the exposure data Es about the background part and the exposure data Ef about the face part, i.e., Es−Ef (Step S305). The microcomputer 114 then determines whether ΔE is greater than threshold value Th (Step S307). The threshold value Th is a threshold value for determining whether the photographed scene is a flare portrait scene or not, as has been explained in connection with the first embodiment. The threshold value Th is set at the time of, for example, designing the camera 100, and then stored in the ROM 112.

In Step S307, ΔE may be greater than Th, or the scene may be found to be a flare portrait scene. In this case, the microcomputer 114 notifies the photographer that the image is a flare portrait scene (Step S308).

FIG. 14 is a diagram showing how the photographer is notified that the scene is a flare portrait scene, by using the display unit 109. First, the microcomputer 114 causes the display unit 109 to display character D and also selection buttons B3 and B4. The character D informs the photographer that the scene is a flare portrait scene. The selection buttons B3 and B4 are displayed, enabling the photographer to select, or not to select, the exposure correction for the flare portrait. In the instance of FIG. 14, the exposure correction for the flare portrait is performed if the selection button B3 is selected and is not performed if the selection button B4 is selected.

The notification may be achieved not only by displaying it on the display unit 109, but also by blinking an LED and/or generating a voice message.

After notifying the photographer that the image is a flare portrait scene, the microcomputer 114 determines whether or not the flare portrait should undergo the exposure correction (Step S309). In Step S309, the microcomputer 114 determines that the flare portrait should undergo the exposure correction if the photographer has selected the selection button B3, and that the flare portrait should not undergo the exposure correction if the photographer has selected the selection button B4.

If the microcomputer 114 determines in Step 309, that flare portrait should undergo the exposure correction, it performs the exposure correction for flare portrait (Step S310). That is, the microcomputer 114 causes the amplifying unit 513 of the face detecting circuit 108 to amplify the image data, pixel by pixel, so that the brightness of the face part detected by the face detecting circuit 108 may have the second appropriate value that is greater than the first appropriate value. The amplification of the image data can result in a flare portrait image comparable with the flare portrait image provided through the exposure process of FIG. 9. A certain amplification factor may be applied to the face part, and a different amplification factor may be applied to the background part. In this case, a flare portrait image can be provided even if the background part is darker than the face part in the scene as described in connection with the second embodiment.

If ΔE is found equal to or smaller than Th in Step S307, if the flare portrait need not undergo the exposure correction in Step 309, or the exposure correction is performed in Step S310, the microcomputer 114 determines whether the reproduction of the image file should be terminated or not (Step S311). In Step S311, the microcomputer 114 determines that the reproduction should be terminated if the photographer has depressed the reproduction button again at the operation unit 113.

If the microcomputer 114 determines, in Step S311, that the reproduction of the image file should be not terminated, the process returns to Step S303, whereby the reproduction of the image file is continued. After the exposure correction has been performed on the image data, the image represented by the image data is displayed by the display unit 109. If microcomputer 114 determines, in Step S311, that the reproduction of the image file should be terminated, the process returns to Step S118.

As has been described, this embodiment can provide a flare portrait image comparable with one acquired in ordinary photographing, by performing the exposure correction in the reproducing mode.

[Modification 1]

A modification of the embodiments described above will be described. In the first modification, an exposure control is performed, adjusting the exposure value of the face part to the second appropriate value. Instead, the exposure value of the areas defining the boundary between the face part and the background part may be used as second appropriate value.

FIG. 15 is a flowchart showing how the modification 1 performs the exposure process in the flare portrait mode. This exposure process is performed in place of Step S112 shown in FIG. 4.

Figure 16A:
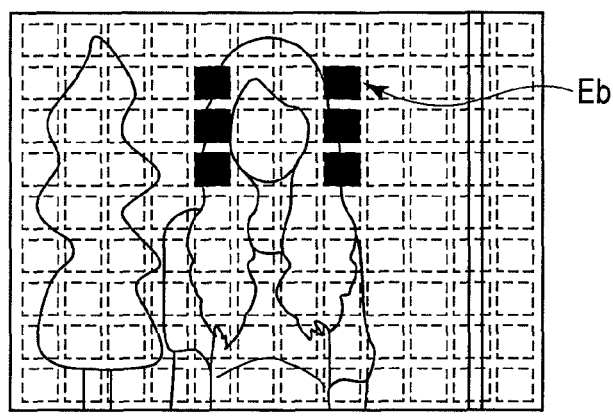
FIG. 16A is the first diagram explaining how the modification 1 performs the exposure process in the flare portrait mode.

As FIG. 15 shows, the microcomputer 114 detects the low-contrast areas surrounding the face part from the image data (Bayer data or YC data) (Step S401). As shown in FIG. 16A, the "areas surrounding the face part" are areas (i.e., black areas) that surround the face part, are closer to the face part than to the background part and undergo small brightness change. The method of detecting low-contrast areas is no more than an example. The low-contrast areas may be detected by any other method.

After detecting the low-contrast areas, the microcomputer 114 detects the low-contrast area brighter than any other low-contrast areas detected (Step S402). Since any flare portrait scene is a backlighted scene including a face part, the areas detected in Step S402 can be considered as the closest to the background part.

Then, the microcomputer 114 detects the areas defining the boundary between the areas detected in Step S402 and the face part detected by the face detecting circuit 108 (Step S403). Thereafter, the microcomputer 114 performs an exposure process using, as a second appropriate value, the exposure value of the areas detected in Step S403 (Step S404). Then, the microcomputer 114 terminates the exposure process of FIG. 15.

Figure 16B:
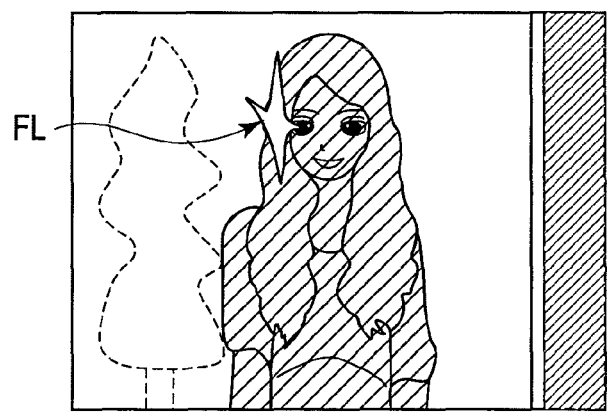
FIG. 16B is the second diagram explaining how the modification 1 performs the exposure process in the flare portrait mode.

In the modification 1 described above, the exposure control is performed using the exposure value of the areas defining the boundary between the face part and the background part as a second appropriate value. These areas are most susceptible to flare. The exposure value of these areas is therefore used as the second appropriate value, enhancing the possibility of generating flare FL around the face part of a person as shown in FIG. 16B. Thus, a high-key image desirable as a portrait in a backlighted scene can be more easily provided than in the first embodiment.

In the modification 1, a flare portrait image is provided by performing only one exposure process, as in the first embodiment. Nonetheless, the exposure control may be repeated several times as in the second embodiment. If this is the case, the exposure control of using the exposure value of the boundary areas as the second appropriate value may be combined with the exposure control of clipping white in the background part. Alternatively, the exposure control of using the exposure value of the face part as the second appropriate value may be combined with the exposure control of clipping white in the boundary areas.

Figure 16C:
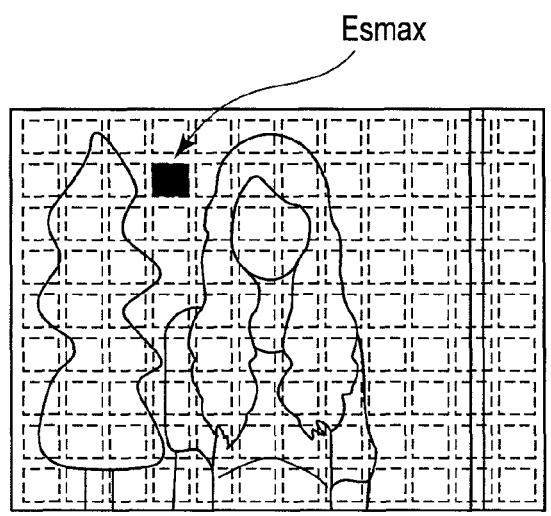
FIG. 16C is the third diagram explaining how the modification 1 performs the exposure process in the flare portrait mode.

Flare is generated from the light in any bright part of the background. As shown in FIG. 16C, the exposure control may be performed by using, as the second appropriate value, the exposure value of the area (black area) adjacent to the low-contrast area having the largest exposure value Esmax. In this case, the flare can be expressed more naturally.

[Modification 2]

In each embodiment described above, the exposure control is performed by using the exposure data calculated from the brightness data generated by the brightness-data generating unit 204. Instead, however, the exposure control may be performed by using the R, G and B components of the Bayer data.

Figure 17:
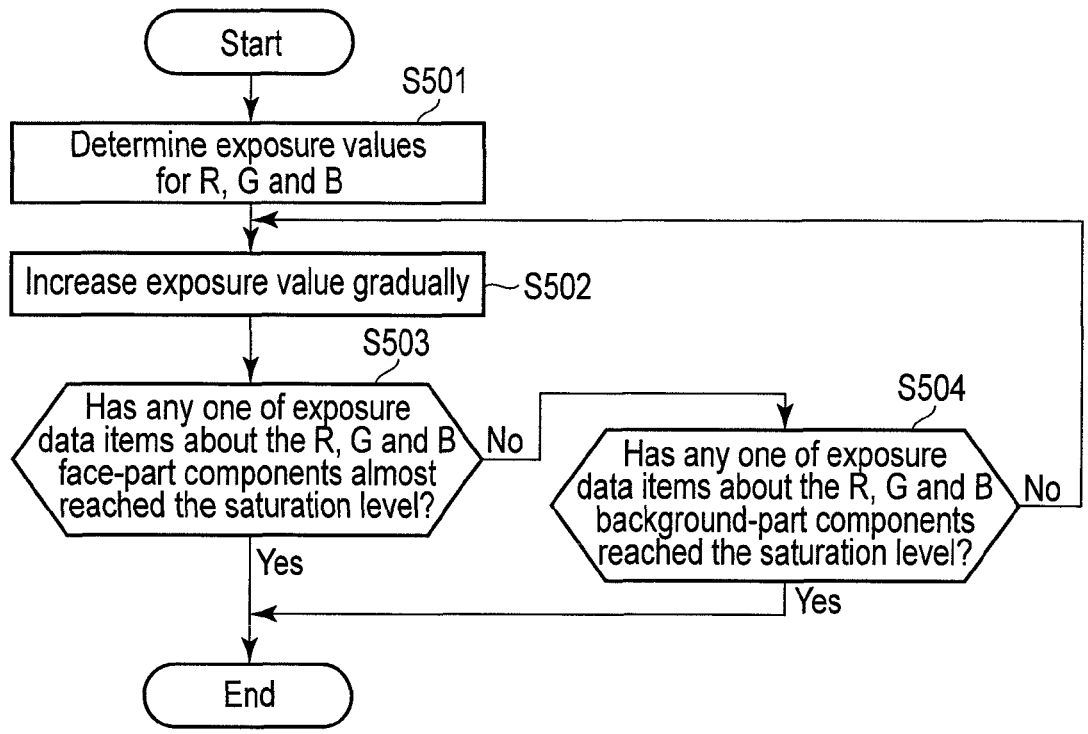
FIG. 17 is a flowchart showing how a modification 2 performs an exposure process in the flare portrait mode.

FIG. 17 is a flowchart showing how a modification 2 performs an exposure process in the flare portrait mode. This exposure process is performed in place of Step S112 shown in FIG. 4.

As shown in FIG. 17, the microcomputer 114 acquires the Bayer data separated into three color components by the pixel-data separating unit 203 of the imaging process circuit 103. The microcomputer 114 then cumulates the color-components of the Bayer data, generating exposure data items for the respective color components (Step S501). The exposure data about the G component is the sum of the exposure data items about the Gr and Gb components.

Next, the microcomputer 114 performs an exposure process, increasing the exposure value gradually (Step S502). In this exposure process, the microcomputer 114 sets exposure conditions (e.g., the aperture opening of the diaphragm 101b and the exposure time of the imaging element 102), thereby increasing the exposure value by a preset value (e.g., 1 EV). The microcomputer 114 then controls the diaphragm 101b and the imaging element 102 in accordance with the exposure conditions.

After performing the exposure process, the microcomputer 114 determines whether any one of the exposure data items about the R, G and B components of the face part detected by the face detecting circuit 108 has almost reached the saturation level (Step S503). If any one of the exposure data items about the R, G and B components has become, for example, 80% of the maximum value DRH for the dynamic range DR, the microcomputer 114 determines that the exposure data has almost reached the saturation level.

In Step S503, none of the exposure data items about the R, G and B components may be found to have almost reached the saturation level. In this case, the microcomputer 114 determines whether any one of the exposure data items about the R, G and B components of the background part has reached the saturation level (Step S504).

In Step S504, none of the exposure data items about the R, G and B components of the background part may be found to have reached the saturation level. If so, the process returns to Step S502. In this case, the microcomputer 114 keeps performing the exposure process to increase the exposure value again.

In Step S503, any one of the R, G and B components of the face part may be found to have almost reached the saturation level. In Step S504, any one of the exposure data items about the R, G and B components of the background part may be found to have almost reached the saturation level. In either case, the microcomputer 114 terminates the exposure process, and then terminates the process of FIG. 17.

In the second modification 2, the exposure data items for the three color components are calculated from the R, G and B components of the Bayer data, respectively, and the exposure values are determined for the color components, respectively, from the exposure data items. The second embodiment can therefore control the exposure values more minutely than in each embodiment described above.

Figure 18:
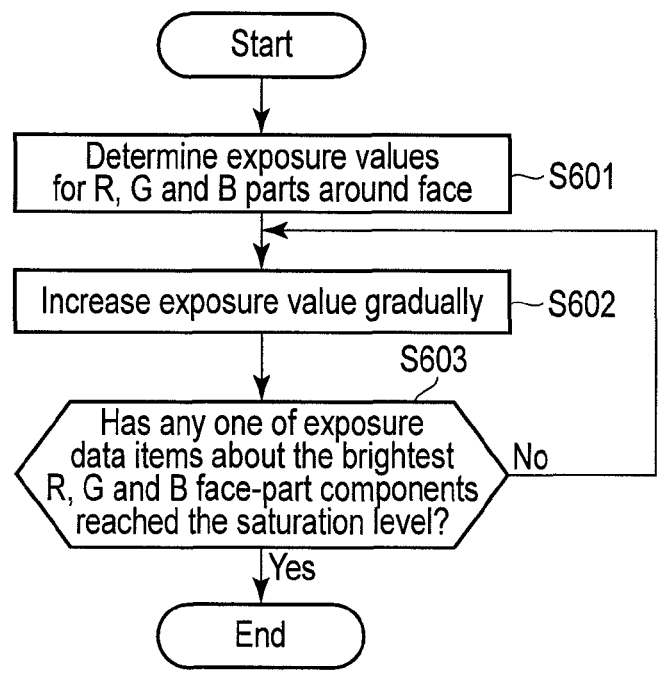
FIG. 18 is a flowchart showing how a digital camera, which is a combination of the modifications 1 and 2, performs an exposure process in the flare portrait mode.

FIG. 18 is a flowchart showing how a digital camera, which is a combination of the modifications 1 and 2, performs an exposure process in the flare portrait mode. This exposure process is performed in place of Step S112 shown in FIG. 4.

As shown in FIG. 18, the microcomputer 114 generates exposure data items for the brightest color components detected by a method similar to Steps S401 and 402 shown in FIG. 15 (Step S601).

The microcomputer 114 then performs an exposure process to increase the exposure value gradually (Step S602). This exposure process is similar to the exposure process explained with reference to FIG. 17.

After performing the exposure process, the microcomputer 114 determines whether any one of the exposure data items for R, G and B components for the brightest area has reached the saturation level (Step S603).

In Step S603, none of the exposure data items for R, G and B components for the brightest area may be found to have reached the saturation level. If this is the case, the process returns to Step S602, and continues the exposure process, gradually increasing the exposure value.

In Step S603, any one of the exposure data items for R, G and B components for the brightest area may be found to have reached the saturation level. In this case, the microcomputer 114 terminates the exposure process shown in FIG. 18.

Also in the modification 2, the exposure data items for the color components R, G and B of the Bayer data are calculated, and the exposure values are determined for the color components R, G and B, and the exposure control is performed in accordance with the exposure values determined. The modification 2 can therefore control the exposure values more minutely than in each embodiment described above.

In the modification 2, the Bayer data is separated into R, G and B components, and exposure values are determined for the R, G and B components, respectively. This is because the image data acquired in the imaging element 102 is Bayer data of the primary color system. Hence, if the imaging element 102 has a color-filter arrangement different from the primary-color arrangement, the color components for which exposure values are determined will differ.

[Modification 3]

In the embodiments and the modifications, all described above, the flare portrait photographing is performed on a flare portrait scene that is actually a backlighted scene including a face part. Nonetheless, the flare portrait photographing may be performed on a scene other than a backlighted scene. In the modification 3, the scene is assumed to be a flare portrait scene, thus enabling the photographer to perform flare portrait photographing in order to provide portraits of a model.

Figure 19:
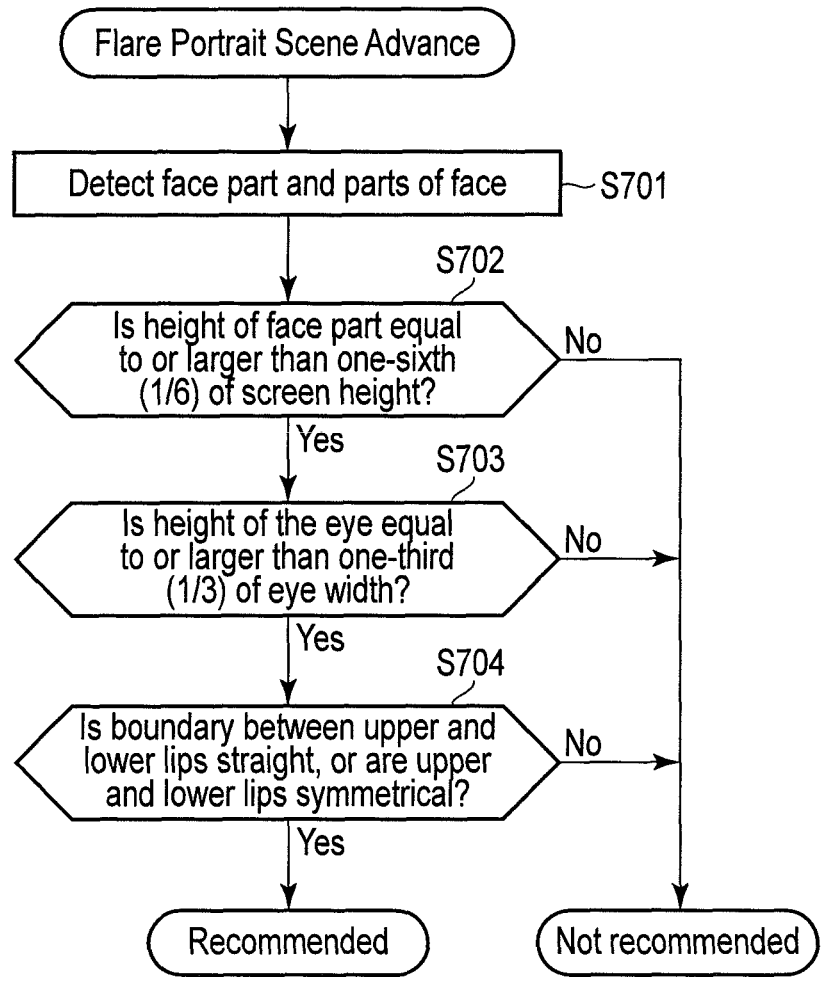
FIG. 19 is a flowchart showing the process performed in a modification 3.

FIG. 19 is a flowchart showing the process performed in the modification 3. In the modification 3, the face detecting circuit 108 detects not only the face part, but also the facial expression from the positions of the parts of face (e.g., eyes, nose and mouth).

As shown in FIG. 19, the microcomputer 114 causes the face detecting circuit 108 to detect the face part and the parts of face (Step S701).

Figure 20A:
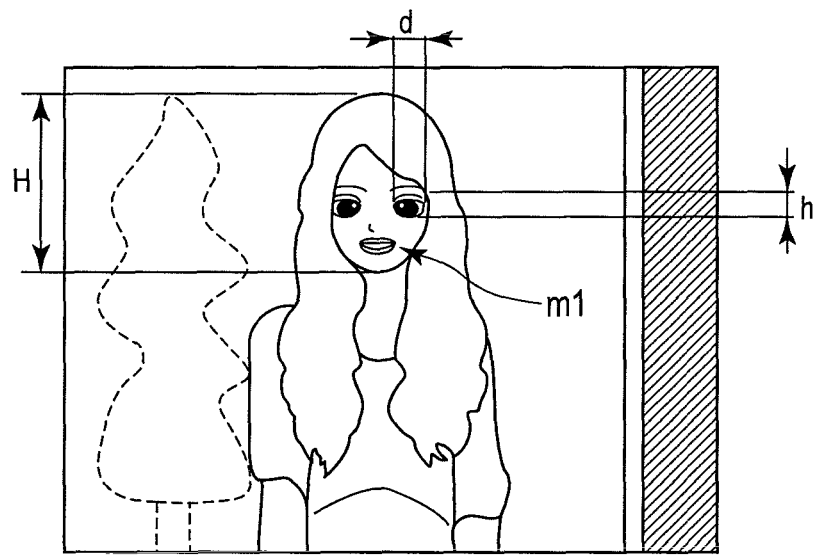
FIG. 20A is a diagram showing the first exemplary facial expression regarded as a flare portrait scene.

After the face detecting circuit 108 has detected the face part and the parts of face, the microcomputer 114 determines whether the ratio of the height of the face part to the screen height of the display unit 109 (i.e., height of the image displayed on the display unit 109) is equal to or larger than a threshold value (i.e., ⅙ height of the image) (Step S702). If the ratio of the height is equal to or larger than the threshold value, it is determined that the photographer wants to perform portrait photographing. As shown in FIG. 20A, the height of the face part is the distance H between the top of the head and the tip of the jaw. If the distance H is equal to or larger than the threshold value (⅙), the decision made in Step S701 is affirmative (Yes). The threshold value is not limited to ⅙, nevertheless.

In Step S702, the ratio the height of the face part detected by the face detecting circuit 108 has with respect to the screen height of the display unit 109 may be determined to be equal to or larger than ⅙. In this case, the microcomputer 114 determines whether the ratio of the height of the eye part detected by the face detecting circuit 108 to the width of the eye part is equal to or larger than a threshold value (i.e., ⅓ height of image) (Step S703). If the eye part has a relatively large height-to-width ratio, the person (i.e., photography subject) seems to be opening his or her eyes fully. In this case, too, the photographer is considered as having the intention of performing portrait photographing. As shown in FIG. 20A, the height of the eye part is the distance h between the upper and lower edges of either eye, and the width of either eye is the distance d between the left and right ends of either eye. If the distance h is equal to or larger than the threshold value (⅓), the decision made in Step S703 is affirmative (Yes). The threshold value is not limited to ⅓, nevertheless.

Figure 20B:
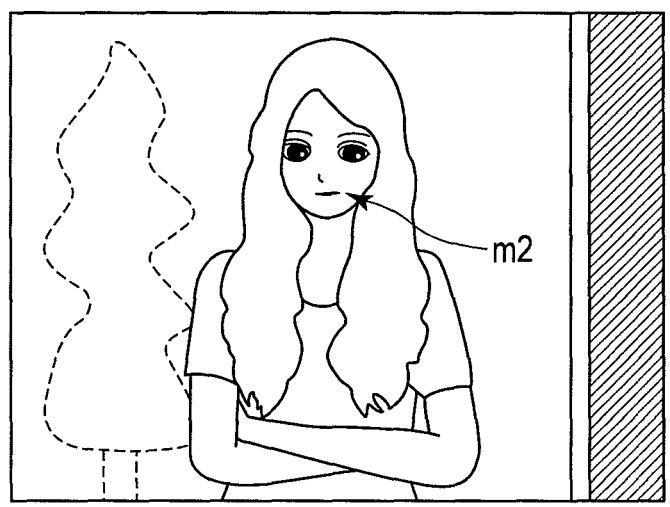
FIG. 20B is a diagram showing the second exemplary facial expression regarded as a flare portrait scene.

In Step S703, the eye part detected by the face detecting circuit 108 may be determined to have a height-to-width ratio equal to or larger than ⅓. In this case, the microcomputer 114 determines whether the boundary between the upper and lower lips is straight or not, and whether the upper and lower lips are symmetrical (Step S704). In FIG. 20B, m2 shows that the boundary between the upper and lower lips is straight. In FIG. 20A, m1 shows that the upper and lower lips are symmetrical. If the person wears the expression of FIG. 20A or the expression of FIG. 20B, the photographer is considered as having the intention of performing portrait photographing.

In Step S704, the microcomputer 114 may determine that the boundary between the upper and lower lips is straight or that the upper and lower lips are symmetrical. If this is the case, the microcomputer 114 determines that scene is a flare portrait scene, and then recommends the flare portrait photographing to the photographer.

In Step S702, the ratio the height of the face part has with respect to the screen height of the display unit 109 may be determined to be neither equal to nor larger than ⅙. In Step S703, the ratio of the height of the eye part detected to the width of the eye part is neither equal to nor larger than ⅓. In Step S704, the boundary between the upper and lower lips may be found not straight and the upper and lower lips may be found not symmetrical. Then, the microcomputer 114 determines that the scene is not a flare portrait scene, and therefore does not recommend the flare portrait photographing to the photographer.

In the modifications described above, the photographer can perform the flare portrait photographing even if the scene is not a backlighted scene.

The technique of determining a backlighted scene and the technique of determining the facial expression of the subject, both described above, may be used in combination. In this case, the flare portrait photographing can be recommended to the photographer if the scene is backlighted and includes a face part and if the decision made in Step 704 (FIG. 19) is affirmative (Yes).

The facial expressions shown in FIGS. 20A and 20B are no more than examples. The model may assume other facial expressions, each defined by a positional relation of the face parts of the model. Therefore, whether or not to perform the flare portrait photographing may be determined in accordance with the arrangement of the face parts.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An imaging apparatus comprising:
   an imaging unit configured to perform photoelectric conversion on a light flux received at an imaging element and to generate image data;
   a face detecting circuit configured to detect a face part of a main subject from the image data; and a control unit configured to compare an exposure value for the face part with an exposure value for a background part, to notify a photographer that a currently-photographed scene is a flare portrait scene if the exposure value for the background part is greater than the exposure value for the face part, and to control exposure so that an exposure value for a boundary area defined as a low contrast area surrounding the face part, being closer to the face part than to the background part, and undergoing small brightness change, is set to a second appropriate value greater than a first appropriate value, the first appropriate value being predetermined.

2. The apparatus according to claim 1, wherein the control unit performs a first exposure control to change the exposure value for the face part in the image data to the second appropriate value and performs a second exposure control to change the exposure value for the background part in the image data to a value larger than the second appropriate value, and the apparatus further comprises a synthesizing unit configured to synthesize image data acquired in the first exposure control with image data acquired in the second exposure control.

3. The apparatus according to claim 1, further comprising an amplifying unit configured to amplify the image data, wherein the control unit controls the amplifying unit so that the exposure value for the face part in the image data changes to the second appropriate value and the exposure value for the background part in the image data changes to a value larger than the second appropriate value.

4. The apparatus according to claim 1, wherein the first appropriate value is obtained based on 18% gray.

5. An imaging apparatus comprising:
an imaging unit configured to perform photoelectric conversion on a light flux received at an imaging element and to generate image data;
a face detecting circuit configured to detect a face part of a main subject from the image data; and
a control unit configured to compare an exposure value for the face part with an exposure value for a background part, to notify a photographer that a currently-photographed scene is a flare portrait scene if the exposure value for the background part is greater than the exposure value for the face part, and to control exposure so that an exposure value for the face part is set to a second appropriate value greater than a first appropriate value, the first appropriate value being predetermined,
wherein the control unit is further configured to determine if the photographed scene is a flare portrait scene in accordance with a facial expression of the face part.

6. The apparatus according to claim 5, wherein the control unit performs a first exposure control to change the exposure value for the face part in the image data to the second appropriate value and performs a second exposure control to change the exposure value for the background part in the image data to a value larger than the second appropriate value, and the apparatus further comprises a synthesizing unit configured to synthesize image data acquired in the first exposure control with image data acquired in the second exposure control.

7. The apparatus according to claim 5, further comprising an amplifying unit configured to amplify the image data, wherein the control unit controls the amplifying unit so that the exposure value for the face part in the image data changes to the second appropriate value and the exposure value for the background part in the image data changes to a value larger than the second appropriate value.

8. The apparatus according to claim 5, wherein the first appropriate value is obtained based on 18% gray.

9. An imaging method comprising:
performing, by an imaging unit, photoelectric conversion on a light flux received at an imaging element and to generate image data;
detecting, by a face detecting circuit, a face part of a main subject from the image data; and
by a control unit, comparing an exposure value for the face part with an exposure value for a background part, notifying a photographer that a currently-photographed scene is a flare portrait scene if the exposure value for the background part is greater than the exposure value for the face part, and controlling exposure so that an exposure value for a boundary area defined as a low contrast area surrounding the face part, being closer to the face part than to the background part, and undergoing small brightness change, is set to a second appropriate value greater than a first appropriate value, the first appropriate value being predetermined.

10. An imaging method comprising:
performing, by an imaging unit, photoelectric conversion on a light flux received at an imaging element and to generate image data;
detecting, by a face detecting circuit, a face part of a main subject from the image data;
comparing, by a control unit, an exposure value for the face part with an exposure value for a background part, notifying a photographer that a currently photographed scene is a flare portrait scene if the exposure value for the background part is greater than the exposure value for the face part, and controlling exposure so that an exposure value for the face part is set to a second appropriate value greater than a first appropriate value, the first appropriate value being predetermined; and
determining, by the control unit, if the photographed scene is a flare portrait scene in accordance with a facial expression of the face part.

11. An imaging apparatus comprising:
an imaging unit configured to perform photoelectric conversion on a light flux received at an imaging element and to generate image data;
a face detecting circuit configured to detect a main subject from the image data; and
a control unit configured to compare an exposure value for the main subject from the image data with an exposure value for a background part, and to make a notification to a photographer to prompt to take a photography using an exposure value for a boundary area defined as a low contrast area surrounding a face part of the main subject, being closer to the face part than to the background part, and undergoing small brightness change, in accordance with a result of the comparison.

12. The imaging apparatus according to claim 11, wherein the control unit is further configured to make the notification in accordance with a facial expression of a face part of the main subject.

13. An imaging method comprising:
performing, by an imaging unit, photoelectric conversion on a light flux received at an imaging element and to generate image data;
detecting, by a face detecting circuit, a main subject from the image data; and comparing, by a control unit, an exposure value for the main subject from the image data with an exposure value for a background part, and making a notification to a photographer to prompt to take a photography using an exposure value for a boundary area defined as a low contrast area surrounding a face part of the main subject, being closer to the face part than to the background part, and undergoing small brightness change, in accordance with a result of the comparison.

* * * * *